US009389815B2

(12) United States Patent
Moriyama

(10) Patent No.: US 9,389,815 B2
(45) Date of Patent: Jul. 12, 2016

(54) CONTROL DEVICE

(71) Applicant: BROTHER KOGYO KABUSHIKI KAISHA, Nagoya-shi, Aichi-ken (JP)

(72) Inventor: Satoru Moriyama, Iwakura (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 359 days.

(21) Appl. No.: 13/798,824

(22) Filed: Mar. 13, 2013

(65) Prior Publication Data

US 2013/0188224 A1 Jul. 25, 2013

Related U.S. Application Data

(63) Continuation-in-part of application No. PCT/JP2012/057289, filed on Mar. 22, 2012.

(30) Foreign Application Priority Data

Mar. 30, 2011 (JP) ................................ 2011-074169

(51) Int. Cl.
*G06F 3/12* (2006.01)
*H04W 84/12* (2009.01)
*H04W 48/14* (2009.01)

(52) U.S. Cl.
CPC ............ *G06F 3/1236* (2013.01); *G06F 3/1204* (2013.01); *G06F 3/1222* (2013.01);
(Continued)

(58) Field of Classification Search
USPC ............ 455/41.2, 41.3, 7; 358/1.15; 709/247; 340/1.1–16.1, 425.1
See application file for complete search history.

(56) References Cited

U.S. PATENT DOCUMENTS 7,742,602 B2 6/2010 Ishidoshiro et al.
8,914,479 B2 * 12/2014 Parks .................... G06F 3/1204 358/1.15

(Continued)

FOREIGN PATENT DOCUMENTS

JP 11143662 5/1999
JP 2004328288 11/2004

(Continued)

OTHER PUBLICATIONS

Japanese International Search Report for PCT/JP2012/057289.

(Continued)

*Primary Examiner* — Edward Urban
*Assistant Examiner* — Ralph H Justus
(74) *Attorney, Agent, or Firm* — McCarter & English, LLP

(57) ABSTRACT

A control device that includes a connection device that connects via USB to a communication terminal that is able to perform communication based on a specific communication system, an acquisition portion that acquires configuration information, via USB, from the communication terminal connected to the connection device, the configuration information being information that is necessary for the communication terminal to perform communication based on the specific communication system and being set for the communication terminal, a reception portion that receives an instruction transmitted from the communication terminal, by performing communication with the communication terminal based on the specific communication system using the configuration information acquired by the acquisition portion, and a control portion that performs control in accordance with the instruction when the reception portion receives the instruction.

10 Claims, 18 Drawing Sheets

10
13
MC S11
GENERATE S13
S15
CONNECT
DRIVER
UI APPLICATION
CONFIGURATION INFORMATION 13
S19
ACTIVATE
UI APPLICATION
DRIVER
UI APPLICATION
CONFIGURATION INFORMATION 13
S17
S21
CONFIGURATION INFORMATION 13
USB
S29
S25
CONFIGURATION INFORMATION 10
(CHANGE)
CONFIGURATION INFORMATION 10
CONFIGURATION INFORMATION 10
S23
S27
14
S31
DRIVER
DATA
WIRELESS LAN
PRINT S37
S33
S35

(52) U.S. Cl.
CPC ............ *G06F3/1284* (2013.01); *G06F 3/1292* (2013.01); *G06F 3/1231* (2013.01); *H04W 48/14* (2013.01); *H04W 84/12* (2013.01)

(56) References Cited

U.S. PATENT DOCUMENTS

| | | | | |
|---|---|---|---|---|
| 2006/0002352 | A1* | 1/2006 | Nakamura | H04L 41/0816 370/338 |
| 2007/0047524 | A1 | 3/2007 | Moriya | |
| 2007/0067503 | A1* | 3/2007 | Hiroki | H04N 1/00278 710/15 |
| 2009/0279526 | A1 | 11/2009 | Ichikawa et al. | |
| 2010/0069008 | A1* | 3/2010 | Oshima | H04W 4/02 455/41.3 |

FOREIGN PATENT DOCUMENTS

| | | |
|---|---|---|
| JP | 2005-175524 | 6/2005 |
| JP | 2006-50587 | 2/2006 |
| JP | 2006-67293 | 3/2006 |
| JP | 2006067373 | 3/2006 |
| JP | 2006338358 | 12/2006 |
| JP | 2007048211 | 2/2007 |
| JP | 2008-205567 | 9/2008 |

OTHER PUBLICATIONS

Japanese Office Action issued in Application No. 2011-074169 on Jan. 28, 2014.

International Preliminary Report on Patentability issued in PCT/JP2012/057289 mailed on Oct. 17, 2013.

* cited by examiner

CONTROL DEVICE

CROSS-REFERENCE TO RELATED APPLICATION

This application is a continuation-in-part of International Application No. PCT/JP2012/057289, filed Mar. 22, 2012, which claims priority from Japanese Patent Application No. 2011-074169, filed on Mar. 30, 2011. This disclosure of the foregoing application is hereby incorporated by reference in its entirety.

BACKGROUND

The present disclosure relates to a control device that can perform communication with a communication terminal via various transmission paths.

There are cases in which communication is performed between a control device and a communication terminal, such as a personal computer (PC) that controls the control device, via various transmission paths. The transmission paths include a wired local area network (LAN), a wireless LAN, Bluetooth (registered trademark), serial communication and the like. Normally, a communication system is different for each transmission path. Therefore, a user of the control device needs to set, for the control device, configuration information that is necessary for the control device to perform communication with the communication terminal, for each communication system.

In many cases, it is troublesome to set configuration information. For example, when the control device performs wireless communication with a communication terminal via an access point, the user needs to set, for the control device, configuration information to perform wireless communication with the access point. In many cases, it is difficult for an unfamiliar user to understand the configuration information that is necessary to perform wireless communication with the access point. This is because the user has to accurately set a considerable number of items of configuration information, such as a service set identifier (SSID) and security settings (an encryption system and an encryption key). In order to eliminate the troublesome task, a technology is proposed in which the configuration information is notified from the access point to the communication terminal via wireless communication. With the technology, by setting the notified configuration information, the control device can easily start wireless communication with the access point.

SUMMARY

However, with the above-described method, the configuration information is notified to the control device by wireless communication. Therefore, there is a possibility that the configuration information may leak to a third party in the course of the notification. In a case where an encryption system and an encryption key are included in the configuration information, if the third party uses the encryption system and the encryption key, the content of the communication between the access point and the control device is easily analyzed by the third party. In this manner, depending on an acquisition method when the control device acquires the configuration information, there is a possibility that the configuration information may leak to the third party and be misused by the third party.

The present disclosure provides a control device that can acquire configuration information safely and easily and can start communication with a communication terminal.

According to the present disclosure, a control device that includes a connection device, an acquisition portion, a reception portion and a control portion is provided. The connection device connects via USB to a communication terminal that is able to perform communication based on a specific communication system. The acquisition portion acquires configuration information, via the USB, from the communication terminal connected by the connection device. The configuration information is information that is necessary for the communication terminal to perform communication based on the specific communication system and is set for the communication terminal. The reception portion receives an instruction transmitted from the communication terminal, by performing communication with the communication terminal based on the specific communication system using the configuration information acquired by the acquisition portion. The control portion performs control in accordance with the instruction when the reception portion receives the instruction.

BRIEF DESCRIPTION OF THE DRAWINGS

Embodiments of the disclosure will be described below in detail with reference to the accompanying drawings in which.

DETAILED DESCRIPTION OF EMBODIMENTS

Figure 1:
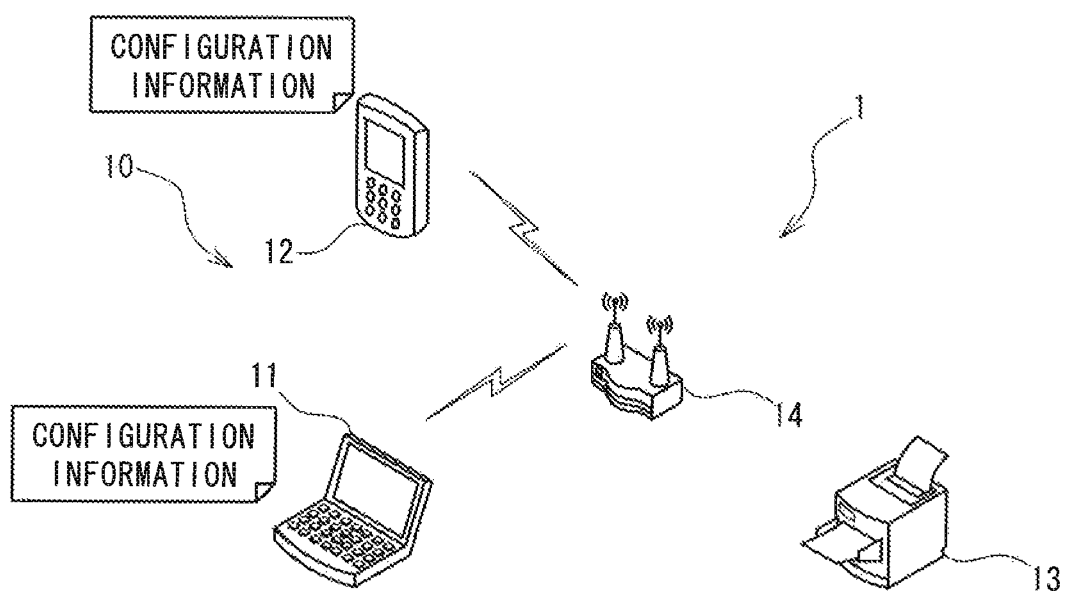
FIG. 1 is a diagram illustrating a method in which a printer 13 acquires configuration information from a communication terminal 10.

Hereinafter, an embodiment of the present disclosure will be explained with reference to the drawings. These drawings are used to explain technological features that can be adopted by the present disclosure. Device configurations, flowcharts of various types of processing and the like illustrated in the drawings are merely explanatory examples, and are not intended to limit the present disclosure to only those examples.

An outline of a printing system 1 will be explained with reference to FIG. 1. The printing system 1 is provided with communication terminals 11 and 12, a printer 13 and an access point 14. Hereinafter, when the communication terminals 11 and 12 are not distinguished from each other, or the communication terminals 11 and 12 are collectively treated, they are also referred to as a communication terminal 10 (or communication terminals 10). The communication terminal 10 and the printer 13 can perform wireless communication with the access point 14. The system of wireless communication that is performed is a communication system in accordance with a wireless LAN standard. Examples of the communication system include IEEE802.11a/b/g. Hereinafter, "performing communication in accordance with a communication system based on a wireless LAN standard" is also referred to as "performing communication by wireless LAN". The communication terminal 10 can cause the printer 13 to print data by transmitting the data to the printer 13 via the access point 14. A known PC or a known tablet terminal can be used as the communication terminal 10. A known printer, a copier or a multifunction machine can be used as the printer 13. For example, a wireless LAN base unit that is used in the wireless LAN can be used as the access point 14.

In FIG. 1, configuration information that is necessary to perform communication by wireless LAN with the access point 14 is set for the communication terminals 11 and 12. Hereinafter, the configuration information that is necessary to perform communication by wireless LAN with the access point 14 is also referred to as wireless LAN configuration information. The wireless LAN configuration information has been set for the communication terminal 10, and the communication terminal 10 is able to perform communication by wireless LAN with the access point 14. Examples of the wireless LAN configuration information include a user ID, a service set identifier (SSID), an encryption system and an encryption key.

On the other hand, since the wireless LAN configuration information has not been set for the printer 13, the printer 13 is not able to perform communication by wireless LAN with the access point 14. Therefore, the communication terminal 10 cannot cause the printer 13 to print data. In order for the communication terminal 10 to cause the printer 13 to print data, the wireless LAN configuration information has to be set for the printer 13. In the present embodiment, setting of the wireless LAN configuration information for the printer 13 is performed by the following procedure, thereby simplifying the setting of the wireless LAN configuration information that is troublesome under normal circumstances.

Figure 2:
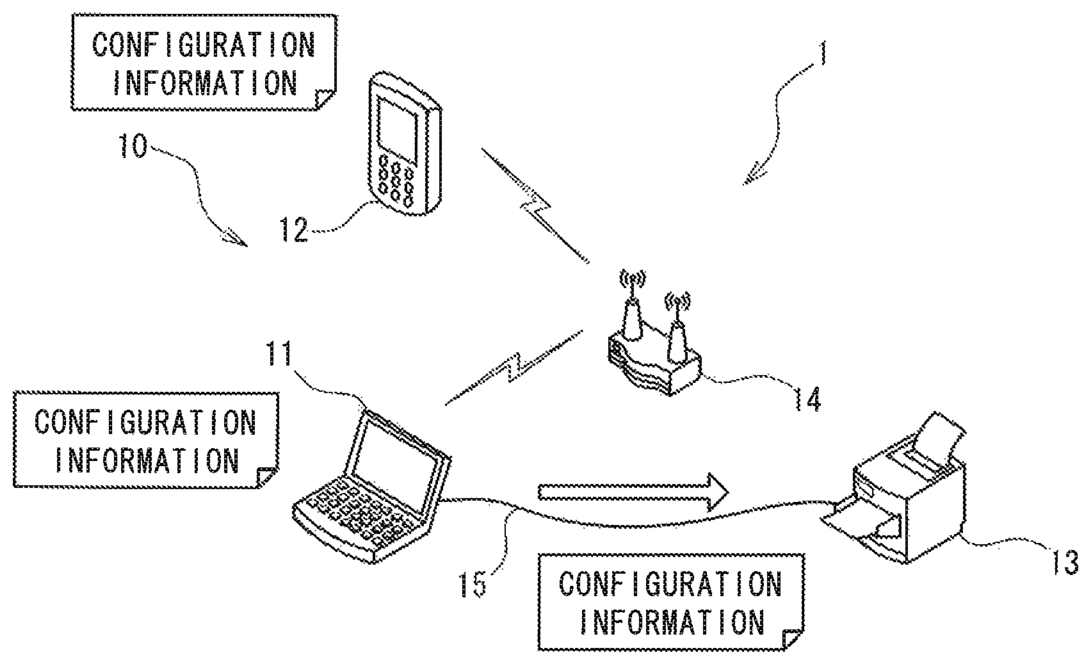
FIG. 2 is a diagram illustrating a method in which the printer 13 acquires the configuration information from the communication terminal 10.

As shown in FIG. 2, first, the printer 13 is connected to the communication terminal 11 via a USB cable 15. The communication terminal 11 notifies the printer 13 of the wireless LAN configuration information set for the communication terminal 11, via the USB cable 15. The printer 13 acquires the wireless LAN configuration information from the communication terminal 11 via the USB cable 15. The acquired wireless LAN configuration information is set for the printer 13. This means that the same wireless LAN configuration information has been set for the communication terminal 11 and the printer 13. The printer 13 becomes able to perform communication by wireless LAN with the access point 14. In this manner, the printer 13 can easily acquire the wireless LAN configuration information from the communication terminal 11 via the USB cable 15. Therefore, the printer 13 can easily and quickly start communication by wireless LAN with the access point 14, without requiring a user to set the wireless LAN configuration information.

Figure 3:
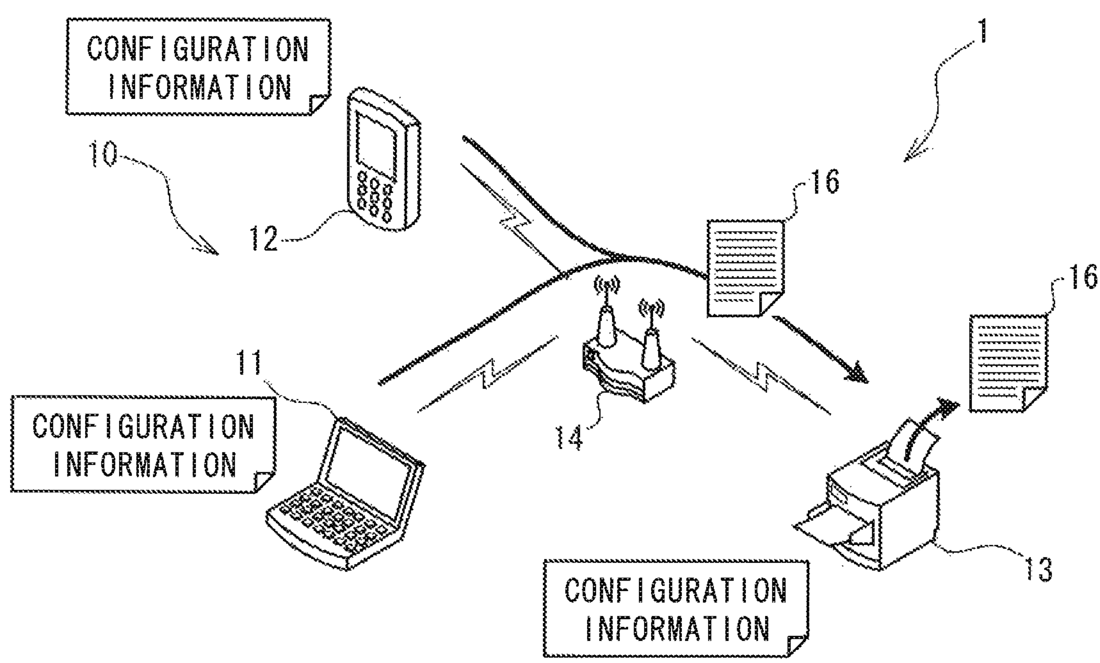
FIG. 3 is a diagram illustrating a method in which the printer 13 acquires the configuration information from the communication terminal 10.

As shown in FIG. 3, it has become possible to perform communication by wireless LAN between the printer 13 and the access point 14. As a result, the communication terminal 10 becomes able to perform communication by wireless LAN with the printer 13 via the access point 14. The communication terminal 10 transmits data 16 to the printer 13 via the access point 14. The printer 13 receives the data 16 and prints the data 16. The printer 13 can also perform communication by wireless LAN with the communication terminal 12 as well as the communication terminal 11. Here, the communication terminal 11 is a communication terminal that has notified the printer 13 of the wireless LAN configuration information, and the communication terminal 12 is a communication terminal that is able to perform communication by wireless LAN with the access point 14.

Note that, with the above-described method, the wireless LAN configuration information is notified from the communication terminal 11 to the printer 13 by communication via the USB cable 15. Therefore, security of communication is higher as compared to a known method in which the wireless LAN configuration information is notified by wireless communication. Therefore, the above-described method is effective in that it is difficult for the wireless LAN configuration information to leak to a third party, as well as in that it is not necessary for the user to perform an operation of setting the wireless LAN configuration information for the printer 13.

Figure 4:
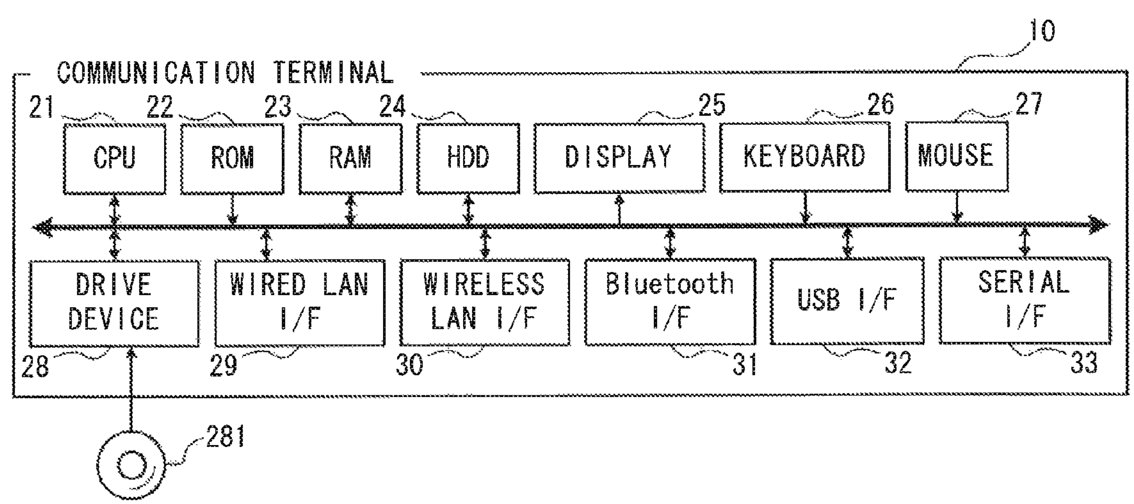
FIG. 4 is a block diagram showing an electrical configuration of the communication terminal 10.

An electrical configuration of the communication terminal 10 will be explained with reference to FIG. 4. The communication terminal 10 includes a CPU 21 that performs overall control of the communication terminal 10. The communication terminal 10 further includes a ROM 22, a RAM 23, a hard disk drive (HDD) 24, a display 25, a keyboard 26, a mouse 27, a drive device 28, a wired LAN interface (hereinafter referred to as a wired LAN I/F) 29, a wireless LAN interface (hereinafter referred to as a wireless LAN I/F) 30, a Bluetooth interface (hereinafter referred to as a Bluetooth I/F) 31, a USB interface (hereinafter referred to as a USB I/F) 32 and a serial communication interface (hereinafter referred to as a serial I/F) 33.

The ROM 22 stores a boot program, a basic input/output system (BIOS) and the like. The RAM 23 stores a timer, a counter and temporary data. The HDD 24 stores a control program for the CPU 21 and an operating system (OS). Further, the HDD 24 stores configuration information that is necessary to perform communication using the control programs (refer to FIG. 6) that will be described later. The drive device 28 can read information stored in a storage medium 281. For example, when the control programs are set up, the control programs stored in the storage medium 281 are read out by the drive device 28 and stored in the HDD 24.

The wired LAN I/F 29 is a controller to perform communication in accordance with a communication system based on a wired LAN standard. Examples of the communication system based on a wired LAN standard include TCP/IP. Hereinafter, "performing communication in accordance with a communication system based on a wired LAN standard" is also referred to as "performing communication by wired LAN". The wireless LAN I/F 30 is a controller to perform communication by wireless LAN. The Bluetooth I/F 31 is a controller to perform communication in accordance with a communication system based on the Bluetooth standard. Hereinafter, "performing communication in accordance with a communication system based on the Bluetooth standard" is also referred to as "performing communication by Bluetooth". The USB I/F 32 is a controller to perform communication in accordance with a communication system based on the USB standard. Hereinafter, "performing communication in accordance with a communication system based on the USB standard" is also referred to as "performing communication by USB". The serial I/F 33 is a controller to perform communication in accordance with a communication system based on a serial communication standard. Examples of the communication system based on a serial communication standard include RS-232C and RS-485. Hereinafter, "performing communication in accordance with a communication system based on a serial communication standard" is also referred to as "performing serial communication".

Figure 5:
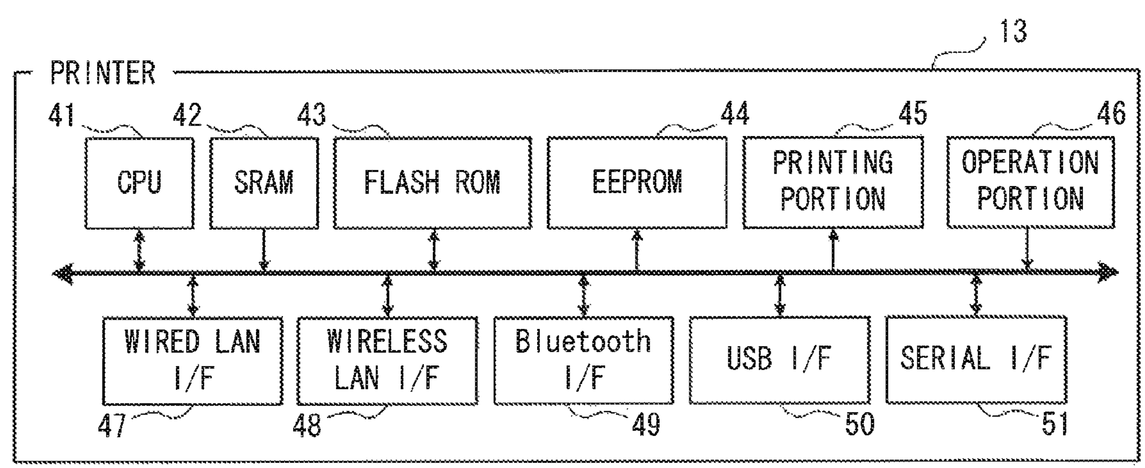
FIG. 5 is a block diagram showing an electrical configuration of the printer 13.

An electrical configuration of the printer 13 will be explained with reference to FIG. 5. The printer 13 includes a CPU 41 that performs overall control of the printer 13. The printer 13 further includes an SRAM 42, a flash ROM 43, an EEPROM 44, a printing portion 45, an operation portion 46, a wired LAN I/F 47, a wireless LAN I/F 48, a Bluetooth I/F 49, a USB I/F 50 and a serial I/F 51. The SRAM 42 stores a timer, a counter and temporary data. The flash ROM 43 stores a control program for the CPU 41. Further, the flash ROM 43 is provided with storage areas that will be described later (refer to FIG. 9). The EEPROM 44 stores configuration information that is necessary to perform communication using the control programs (refer to FIG. 6) that will be described later. The printing portion 45 includes an ink head to perform printing on a printing medium, and a feed roller that feeds the printing medium. The operation portion 46 is a switch to perform setting for the printer 13.

Figure 6:
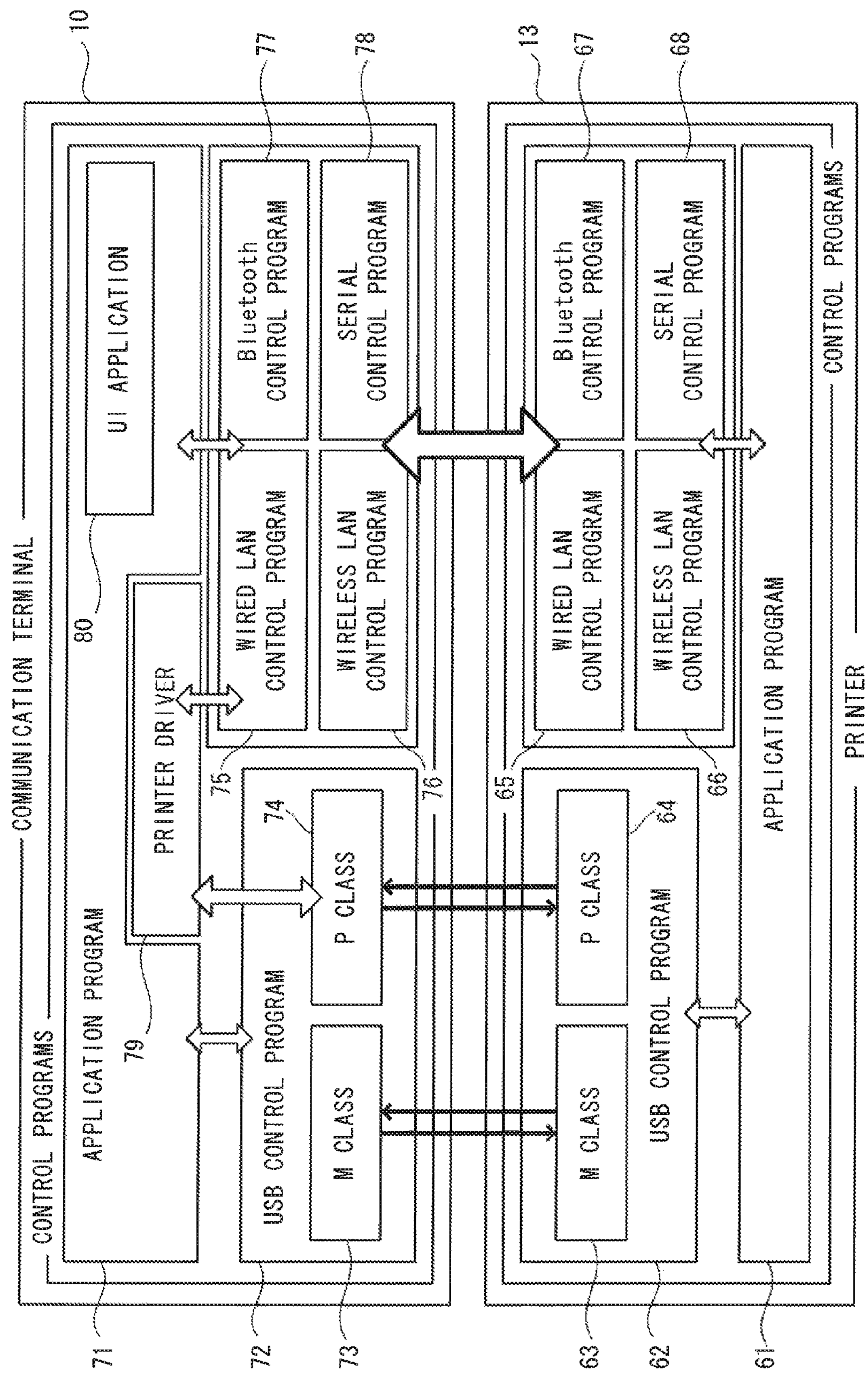
FIG. 6 is a schematic diagram showing configurations of control programs that are installed in the communication terminal 10 and the printer 13.

Configurations of the control programs stored in the communication terminal 10 and the printer 13 will be explained with reference to FIG. 6. First, the configuration of the control programs stored in the flash ROM 43 of the printer 13 will be explained. The control programs include an application program 61, a USB control program 62, a wired LAN control program 65, a wireless LAN control program 66, a Bluetooth control program 67 and a serial control program 68. The application program 61 performs upper level processing of the control programs. Examples of the upper level processing include file operations (writing and reading) and issuing a command to each of the control programs.

The USB control program 62 is a device driver program that is necessary to perform communication by USB. The USB control program 62 is provided with a mass storage class driver (hereinafter referred to as an M class) 63 and a printer class driver (hereinafter referred to as a P class) 64. When the communication terminal 10 is connected to the printer 13 via the USB cable 15 (refer to FIG. 2), the M class 63 can cause the communication terminal 10 to recognize the printer 13 as a mass storage device. When the communication terminal 10 recognizes the printer 13 as a mass storage device, the communication terminal 10 can directly read information from the specified storage area (refer to FIG. 9, to be described later) of the flash ROM 43 of the printer 13. Further, when the communication terminal 10 recognizes the printer 13 as a mass storage device, the communication terminal 10 can directly write information into the specified storage area of the flash ROM 43 of the printer 13.

When the communication terminal 10 is connected to the printer 13 via the USB cable 15, the P class 64 can cause the communication terminal 10 to recognize the printer 13 as a printer device. When the communication terminal 10 recognizes the printer 13 as a printer device, the communication terminal 10 can cause the printer 13 to perform printing processing using a control method similar to that of a known printer. For example, by transmitting data to the printer 13, the communication terminal 10 can cause the printer 13 to perform printing processing of the data.

The printer 13 enables the M class 63 or the P class 64 depending on a state of the operation portion 46 (refer to FIG. 5), and uses it as the USB control program 62. By switching the state of the operation portion 46, the user can switch between causing the communication terminal 10 to recognize the printer 13 as a mass storage device and causing the communication terminal 10 to recognize the printer 13 as a printer device.

The wired LAN control program 65 is a device driver program that is necessary to perform communication by wired LAN. The wireless LAN control program 66 is a device driver program that is necessary to perform communication by wireless LAN. The Bluetooth control program 67 is a device driver program that is necessary to perform communication by Bluetooth. The serial control program 68 is a device driver program that is necessary to perform serial communication. Each of the control programs operates based on the configuration information stored in the EEPROM 44 (refer to FIG. 5). Specifically, the wired LAN control program 65 operates based on wired LAN configuration information stored in the EEPROM 44. The wireless LAN control program 66 operates based on wireless LAN configuration information stored in the EEPROM 44. The Bluetooth control program 67 operates based on Bluetooth configuration information stored in the EEPROM 44. The serial control program 68 operates based on serial configuration information stored in the EEPROM 44.

The configuration of the control programs stored in the HDD 24 of the communication terminal 10 will be explained. The control programs include an application program 71, a USB control program 72, a wired LAN control program 75, a wireless LAN control program 76, a Bluetooth control program 77, a serial control program 78, a printer driver 79 and a user interface application (hereinafter referred to as a UI application) 80.

The USB control program 72 is provided with an M class 73 and a P class 74. The M class 73 is used to access the M class 63 of the printer 13. The communication terminal 10 recognizes the printer 13 as a mass storage device via the M class 63 and the M class 73. The P class 74 is used to access the P class 64 of the printer 13. The communication terminal 10 recognizes the printer 13 as a printer device via the P class 64 and the P class 74.

When the communication terminal 10 is connected to the printer 13 via the USB cable 15 (refer to FIG. 2), the communication terminal 10 determines which class is enabled in the printer 13. The communication terminal 10 selects and uses the M class 73 or the P class 74 based on the determined class. Thus, the communication terminal 10 recognizes the connected printer 13 as a mass storage device or as a printer device.

The M class 73 is normally pre-installed in the OS of the communication terminal 10. Therefore, when the M class 63 is enabled in the printer 13, the communication terminal 10 can reliably recognize the printer 13 as a mass storage device. In the present embodiment, the wireless LAN configuration information is notified from the communication terminal 10 to the printer 13 in a state in which the communication terminal 10 recognizes the printer 13 as a mass storage device. The communication terminal 10 can easily and reliably notify the printer 13 of the wireless LAN configuration information, by storing the wireless LAN configuration information in a change request area 440 (refer to FIG. 9) of the flash ROM 43 of the printer 13.

On the other hand, when the P class 64 is enabled in the printer 13, the communication terminal 10 recognizes the printer 13 as a printer device. By transmitting data to the printer 13 via the USB cable 15 (refer to FIG. 2) in this state, the communication terminal 10 can cause the printer 13 to perform printing processing of the data. The printer 13 performs the printing processing when the printer 13 receives the data via the USB cable 15.

The wired LAN control program 75, the wireless LAN control program 76, the Bluetooth control program 77 and the serial control program 78 operate based on the configuration information stored in the HDD 24. Specifically, the wired LAN control program 75 operates based on wired LAN configuration information stored in the HDD 24. The wireless LAN control program 76 operates based on wireless LAN configuration information stored in the HDD 24. The Bluetooth control program 77 operates based on Bluetooth configuration information stored in the HDD 24. The serial control program 78 operates based on serial configuration information stored in the HDD 24.

The printer driver 79 is a device driver that is necessary when the communication terminal 10 causes the printer 13 to perform printing processing. When the communication terminal 10 transmits to the printer 13 data to be printed, it is necessary for the communication terminal 10 to prepare the printer driver 79 in advance. In the present embodiment, the printer driver 79 is generated by the printer 13 before communication is started between the printer 13 and the communication terminal 10. The generated printer driver 79 is stored in a printer driver area 431 (refer to FIG. 9) of the flash ROM 43. In a state in which the communication terminal 10 recognizes the printer 13 as a mass storage device, the communication terminal 10 reads and acquires the generated printer driver 79 from the printer driver area 431 of the flash ROM 43 of the printer 13. Thus, the communication terminal 10 can transmit data to the printer 13 using the acquired printer driver 79, and can cause the printer 13 to print the data. The user of the communication terminal 10 need not install the printer driver 79 in the communication terminal 10 in advance.

The UI application 80 is an application for the user to change the wireless LAN configuration information that is notified from the communication terminal 10 to the printer 13. The user of the communication terminal 10 activates the UI application 80 and performs an input operation on the communication terminal 10. The user can change the wireless LAN configuration information to the extent that communication by wireless LAN can be performed with the access point 14. For example, the user can change the user ID of the wireless LAN configuration information. The changed wireless LAN configuration information is notified to the printer 13.

Similarly to the printer driver 79, the UI application 80 is generated by the printer 13 before communication is started between the printer 13 and the communication terminal 10. The generated UI application 80 is stored in a UI application area 432 (refer to FIG. 9) of the flash ROM 43. In a state in which the communication terminal 10 recognizes the printer 13 as a mass storage device, the communication terminal 10 can read and acquire the generated UI application 80 from the UI application area 432 of the flash ROM 43 of the printer 13. The communication terminal 10 can use the acquired UI application 80. The user of the communication terminal 10 need not install the UI application 80 in the communication terminal 10 in advance.

Communication that is performed between the communication terminal 10 and the printer 13 will be explained with reference to FIG. 7. The printer 13 determines a state of the operation portion 46 (refer to FIG. 5), and determines whether to enable the M class 63 (refer to FIG. 6) or to enable the P class 64 (refer to FIG. 6). Here, it is assumed that the M class 63 is enabled (S11). The printer 13 generates the printer driver 79 (refer to FIG. 6) and the UI application 80 (refer to FIG. 6) to be used in the communication terminal 10 (S13). The generated printer driver 79 is stored in the printer driver area 431 (refer to FIG. 9) of the flash ROM 43. The generated UI application 80 is stored in the UI application area 432 (refer to FIG. 9) of the flash ROM 43. Further, the printer 13 reads out the wireless LAN configuration information stored in the EEPROM 44 and stores the wireless LAN configuration information in a second configuration information area 435 (refer to FIG. 9) of a configuration information area 433 of the flash ROM 43.

The communication terminal 10 and the printer 13 are connected via the USB cable 15 (refer to FIG. 2) (S15). The communication terminal 10 recognizes the printer 13 as a mass storage device. The communication terminal 10 reads and acquires the printer driver 79, the UI application 80 and the wireless LAN configuration information from the flash ROM 43 of the printer 13 (S17).

The user performs an operation to activate the UI application 80 (S19). The UI application 80 acquired at S17 is activated in the communication terminal 10. When the UI application 80 is executed, the wireless LAN configuration information of the printer 13 acquired at S17 is displayed on the display 25 (refer to FIG. 4) and is notified to the user (S21). The user can recognize the wireless LAN configuration information that has been set for the printer 13 at this point in time. The wireless LAN configuration information stored in the HDD 24 is read out by the UI application 80 (S23). The read out wireless LAN configuration information is displayed on the display 25 and can be changed.

Figure 8:
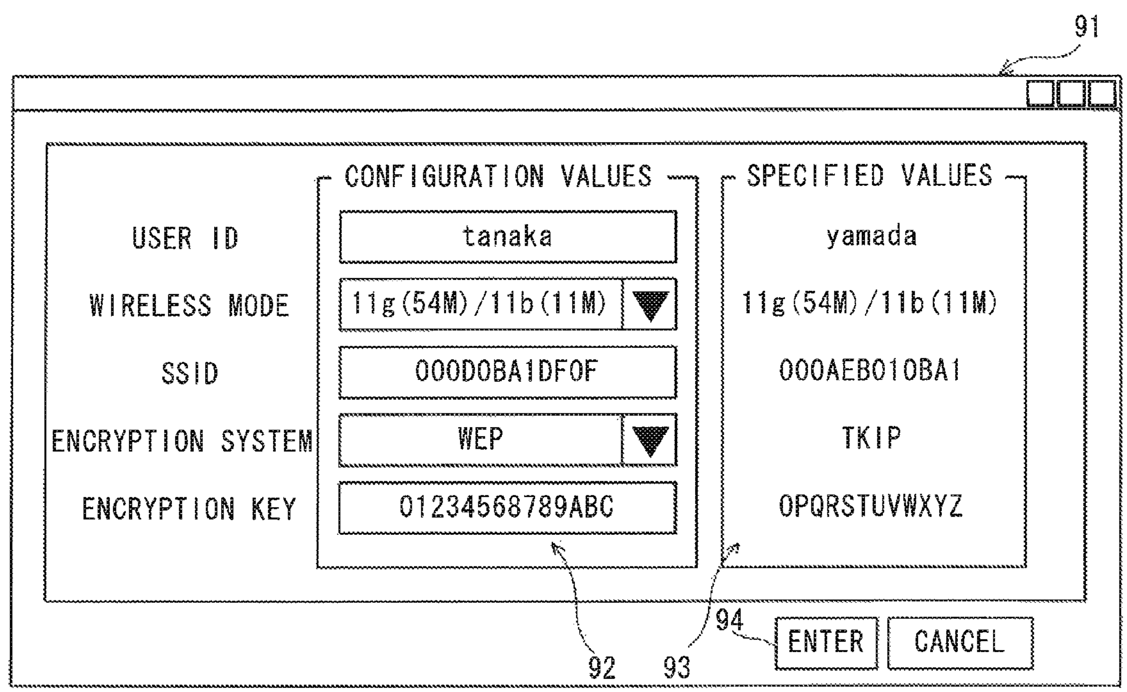
FIG. 8 is a schematic diagram showing a screen 91 that is displayed on a display 25.

An example of the screen that is displayed on the display 25 of the communication terminal 10 will be explained with reference to FIG. 8. A screen 91 includes configuration values 92, specified values 93 and an enter button 94. The wireless LAN configuration information read out from the HDD 24 is displayed as the configuration values 92. The configuration values 92 can be changed by the user. The wireless LAN configuration information acquired from the printer 13 is displayed as the specified values 93. The enter button 94 is selected when the wireless LAN configuration information displayed as the configuration values 92 is confirmed.

By referring to the screen 91, the user can recognize the wireless LAN configuration information that has been set for the communication terminal 10 and the printer 13 at this point in time. The user can change the wireless LAN configuration information displayed as the configuration values 92, if necessary, while referring to the wireless LAN configuration information set for the printer 13. For example, the user can change the user ID, which is information for the access point 14 to identify the printer 13, to the user ID "yamada" that has been set for the printer 13 at this point in time. A wireless mode, the SSID, the encryption system and the encryption key, which are information necessary to perform communication by wireless LAN with the access point 14, are not changed. In this manner, the user performs an operation on the communication terminal 10 based on the UI application 80 that is being executed. Thus, the user can appropriately change the wireless LAN configuration information to the extent that communication by wireless LAN is not impaired.

Figure 7:
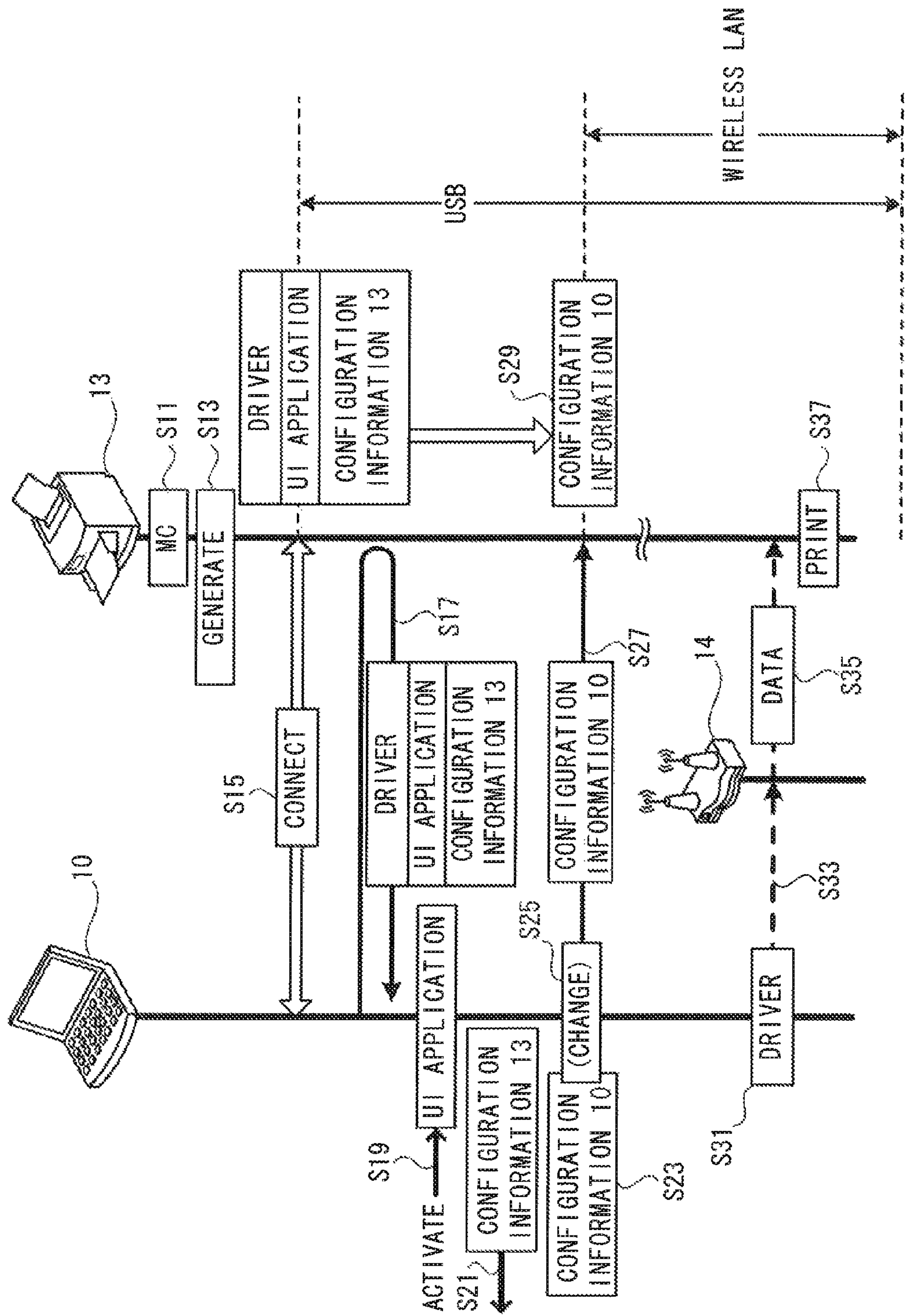
FIG. 7 is a sequence diagram showing communication that is performed between the communication terminal 10 and the printer 13.

It is assumed that the enter button 94 (refer to FIG. 8) is selected after the wireless LAN configuration information has been appropriately corrected by the user as shown in FIG. 7 (S25). The wireless LAN configuration information displayed as the configuration values 92 (refer to FIG. 8) is stored in the change request area 440 (refer to FIG. 9) of a command area 439 of the flash ROM 43. As a result, the wireless LAN configuration information is notified to the printer 13 (S27).

The printer 13 reads out the wireless LAN configuration information from the change request area 440 of the command area 439 of the flash ROM 43 (S29). The read out wireless LAN configuration information is stored in the EEPROM 44. The wireless LAN control program 66 (refer to FIG. 6) operates based on the wireless LAN configuration information stored in the EEPROM 44.

The wireless LAN configuration information set for the printer 13 is the same as the wireless LAN configuration information set for the communication terminal 10, or is the wireless LAN configuration information that has been changed to the extent that communication by wireless LAN is not impaired. Therefore, the printer 13 becomes able to start communication by wireless LAN with the access point 14. The communication terminal 10 becomes able to perform communication by wireless LAN with the printer 13 via the access point 14.

The communication terminal 10 uses the printer driver 79 acquired at step S17 (S31). The communication terminal 10 transmits data to the access point 14 in order to cause the printer 13 to print the data (S33). The access point 14 receives the data from the communication terminal 10, and relays and transfers the data to the printer 13 (S35). The printer 13 receives the data from the access point 14. The printer 13 prints the received data (S37).

As explained above, the printer 13 can acquire the wireless LAN configuration information, which is necessary to perform communication by wireless LAN with the access point 14, from the communication terminal 10 via the USB cable 15. The printer 13 can start communication by wireless LAN with the communication terminal 10 via the access point 14, by using the acquired wireless LAN configuration information. It is not necessary for the user to set the wireless LAN configuration information for the printer 13. Therefore, the user can easily start communication between the printer 13 and the access point 14 via a wireless LAN.

Figure 9:
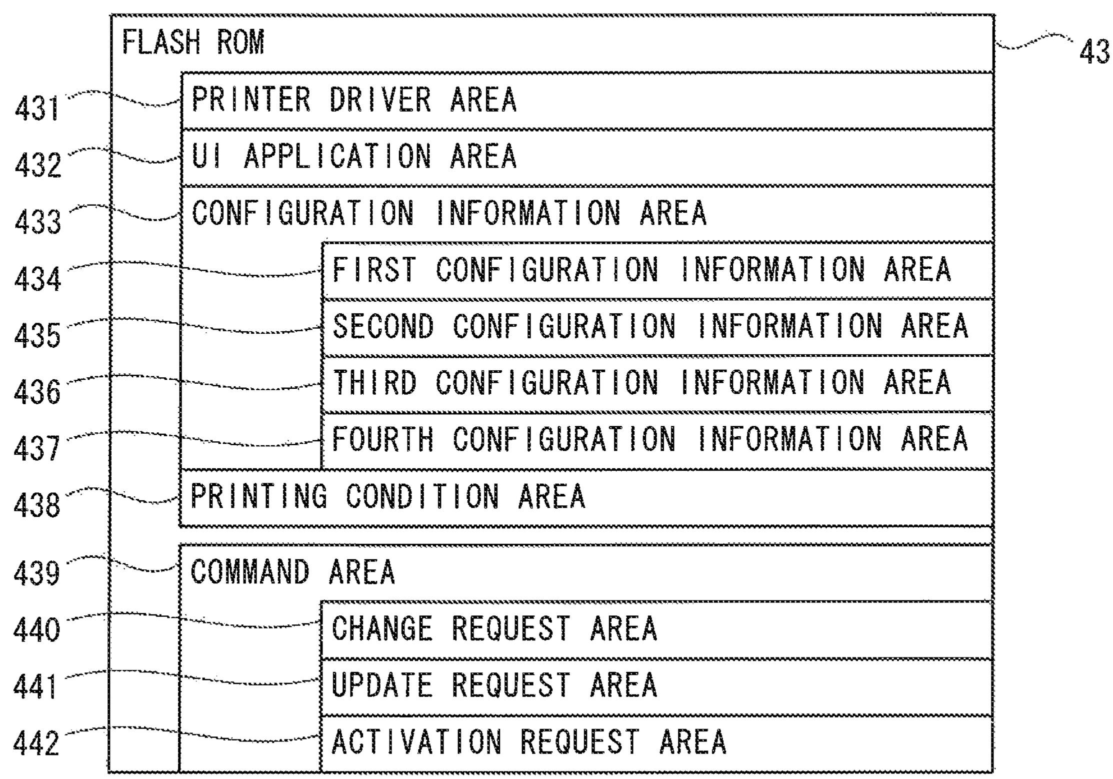
FIG. 9 is a schematic diagram showing a storage area of a flash ROM 43.

The storage areas provided in the flash ROM 43 of the printer 13 will be explained with reference to FIG. 9. The printer driver area 431, the UI application area 432, the configuration information area 433, a printing condition area 438 and the command area 439 are provided in the flash ROM 43.

The printer driver area 431, the UI application area 432, the configuration information area 433 and the printing condition area 438 are areas for which information reading only by the communication terminal 10 is permitted in a state in which the communication terminal 10 recognizes the printer 13 as a mass storage device. Information writing to the printer driver area 431, the UI application area 432, the configuration information area 433 and the printing condition area 438 by the communication terminal 10 is prohibited. On the other hand, information reading/writing from/into the command area 439 by the communication terminal 10 is permitted in a state in which the communication terminal 10 recognizes the printer 13 as a mass storage device.

The printer driver 79 (refer to FIG. 6) is stored in the printer driver area 431. The printer driver 79 is necessary for the communication terminal 10 to cause the printer 13 to perform printing processing. The communication terminal 10 can cause the printer 13 to perform printing processing, by reading out the printer driver 79 from the printer driver area 431 and using it. The UI application 80 (refer to FIG. 6) is stored in the UI application area 432. The UI application 80 is used by the user to change the wireless LAN configuration information to be notified from the communication terminal 10 to the printer 13. The communication terminal 10 can change the wireless LAN configuration information to be notified to the printer 13, by reading out the UI application 80 from the UI application area 432 and using it. Printing conditions at the time of printing are stored in the printing condition area 438. The printing conditions include a resolution, a printing speed and a density.

Configuration information that is necessary for the printer 13 to perform communication is stored in the configuration information area 433. The configuration information area 433 is provided with a first configuration information area 434, a second configuration information area 435, a third configuration information area 436 and a fourth configuration information area 437. The wired LAN configuration information is stored in the first configuration information area 434. Examples of the wired LAN configuration information include a MAC address, an IP address and a user ID. The wireless LAN configuration information is stored in the second configuration information area 435. The Bluetooth configuration information is stored in the third configuration information area 436. Examples of the Bluetooth configuration information include a pass key. The serial configuration information is stored in the fourth configuration information area 437. Examples of the serial configuration information include a transmission speed and existence or non-existence of parity.

Information about a notification and a request from the communication terminal 10 to the printer 13 is stored in the command area 439. The command area 439 is provided with the change request area 440, an update request area 441 and an activation request area 442.

When the communication terminal 10 requests a change of the wireless LAN configuration information, the communication terminal 10 stores the wireless LAN configuration information in the change request area 440. The printer 13 reads out the wireless LAN configuration information stored in the change request area 440 and stores the wireless LAN configuration information in the EEPROM 44. The wireless LAN control program 66 (refer to FIG. 6) operates based on the wireless LAN configuration information stored in the EEPROM 44. The wireless LAN configuration information is set for the printer 13 in this manner. The printer 13 can acquire the configuration information that is directly stored in the change request area 440 by the communication terminal 10. It is therefore possible to reliably inhibit the configuration information from leaking to a third party.

The update request area 441 is used when the communication terminal 10 requests that the content of the second configuration information area 435 be updated to the wireless LAN configuration information stored in the EEPROM 44. When an update request is stored in the update request area 441, the printer 13 reads out the wireless LAN configuration information from the EEPROM 44 and stores the wireless LAN configuration information in the second configuration information area 435. After the update request has been stored in the update request area 441, the communication terminal 10 can acquire the latest wireless LAN configuration information set for the printer 13, by reading out the wireless LAN configuration information stored in the second configuration information area 435.

The activation request area 442 is used when the communication terminal 10 requests the printer 13 to perform test printing. The communication terminal 10 stores a test printing execution request in the activation request area 442. When the test printing execution request is stored in the activation request area 442, the printer 13 prints print data for test printing that has been separately received. Even in a state in which the communication terminal 10 recognizes the printer 13 as a mass storage device, the communication terminal 10 can cause the printer 13 to perform printing processing by directly writing print data into the activation request area 442.

Main processing (printer) that is performed by the CPU 41 (refer to FIG. 5) of the printer 13 will be explained with reference to FIG. 10 to FIG. 13. The main processing (printer) is activated and performed by the CPU 41 when the power source of the printer 13 is turned on.

Figure 10:
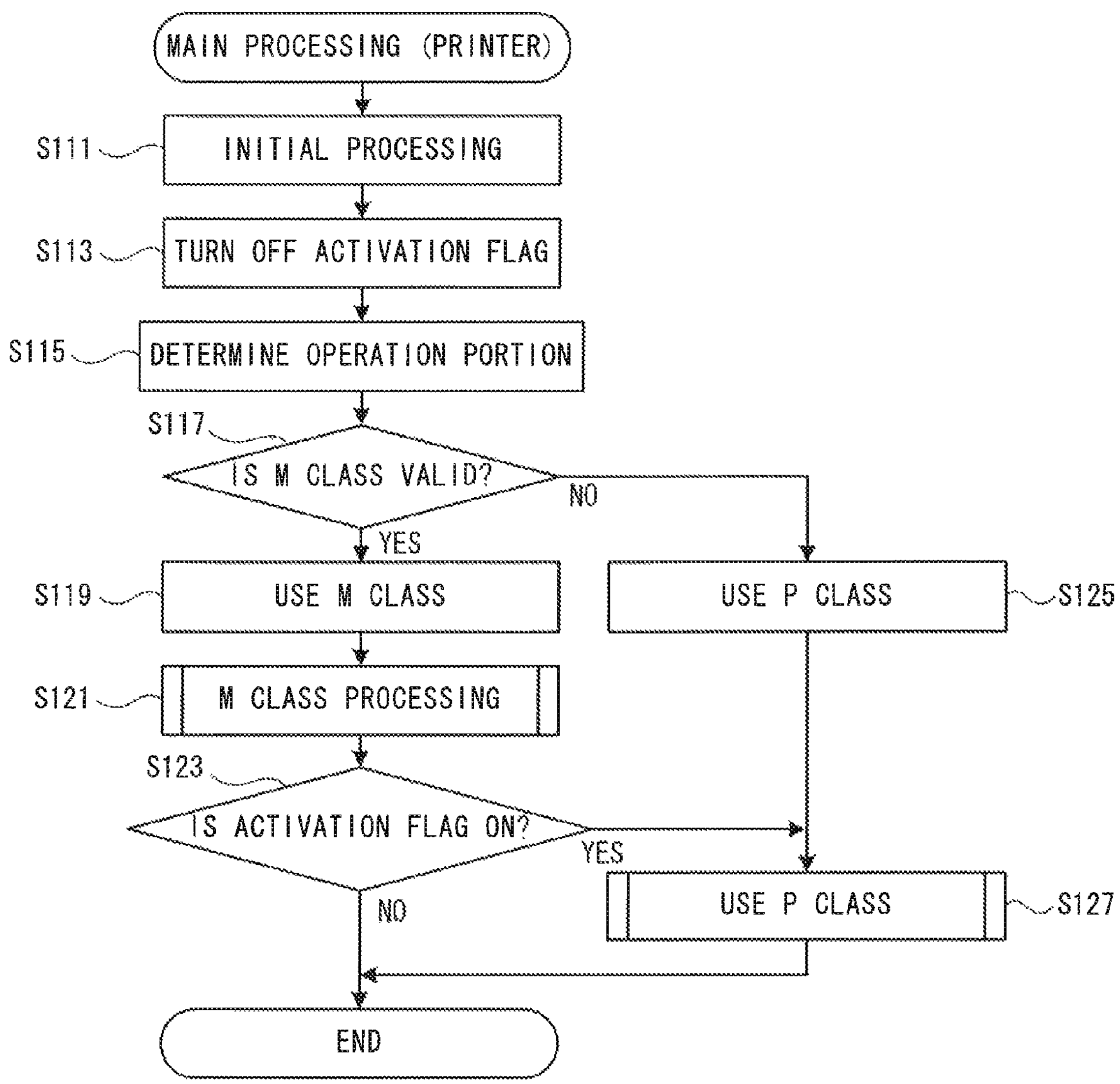
FIG. 10 is a flowchart showing main processing (printer)

As shown in FIG. 10, when the power source of the printer 13 is turned on and the main processing (printer) is activated, initial processing is performed (step S111). In the initial processing, operation confirmation of the printing portion 45 (refer to FIG. 5) is performed. As a result, the printer 13 becomes able to perform printing processing in accordance with a printing instruction from the communication terminal 10.

An activation flag stored in the SRAM 42 (refer to FIG. 5) is turned off (step S113). The activation flag is used to indicate whether there is an instruction to perform test printing from the communication terminal 10. Details will be described later. The state of the operation portion 46 (refer to FIG. 5) is determined (step S115). Based on the determined state of the operation portion 46, it is determined whether the M class 63 or the P class 64 (refer to FIG. 6) is enabled. When the user sets the wireless LAN configuration information for the printer 13, the user operates the operation portion 46 to select the M class 63. On the other hand, when the user performs printing using the printer 13, the user operates the operation portion 46 to select the P class 64.

When the state of the operation portion 46 has been determined and it is determined that the M class 63 is enabled (yes at step S117), the M class 63 is used as the USB control program 62 (refer to FIG. 6) (step S119). When the communication terminal 10 is connected via the USB cable 15 (refer to FIG. 2), the communication terminal 10 recognizes the printer 13 as a mass storage device. Processing (M class processing, refer to FIG. 11) that acquires configuration information from the communication terminal 10 is performed (step S121). The M class processing will be described in detail later.

On the other hand, when it is determined that the P class 64 is enabled (no at step S117), the P class 64 is used as the USB control program 62 (step S125). When the communication terminal 10 is connected via the USB cable 15, the communication terminal 10 recognizes the printer 13 as a printer device. Processing (P class processing, refer to FIG. 13) that performs printing processing in accordance with an instruction from the communication terminal 10 is performed (step S127). The P class processing will be described in detail later. After the P class processing is complete, the main processing (printer) ends.

The M class processing will be explained with reference to FIG. 11. The printer driver 79 (refer to FIG. 6) is generated. The printer driver 79 is necessary when the communication terminal 10 issues a printing instruction to the printer 13. The generated printer driver 79 is stored in the printer driver area 431 (refer to FIG. 9) of the flash ROM 43 (step S131). The UI application 80 (refer to FIG. 6) is generated. The UI application 80 is necessary when the user of the communication terminal 10 changes the wireless LAN configuration information. The generated UI application 80 is stored in the UI application area 432 (refer to FIG. 9) of the flash ROM 43 (step S133). The configuration information area 433 is cleared and initialized (step S135). The command area 439 is cleared and initialized (S137).

It is determined whether the communication terminal 10 has been connected via the USB cable 15 (step S139). When the communication terminal 10 has not been connected (no at step S139), the processing returns to step S139. When the communication terminal 10 has been connected via the USB cable 15 (yes at step S139), the communication terminal 10 recognizes the printer 13 as a mass storage device because the M class 63 has been enabled at step S119 (refer to FIG. 10). The communication terminal 10 becomes able to access the flash ROM 43.

It is determined whether the communication terminal 10 has stored information in the command area 439 (refer to FIG. 9) of the flash ROM 43 (step S141). When information has not been stored in the command area 439 (no at step S141), it means that no request has been made by the communication terminal 10. The processing proceeds to step S145. On the other hand, when the communication terminal 10 has stored information in the command area 439 (yes at step S141), various types of processing are performed in accordance with the information stored in the command area 439 (step S143, command processing, refer to FIG. 12). After the command processing is complete, the processing proceeds to step S145.

Figure 12:
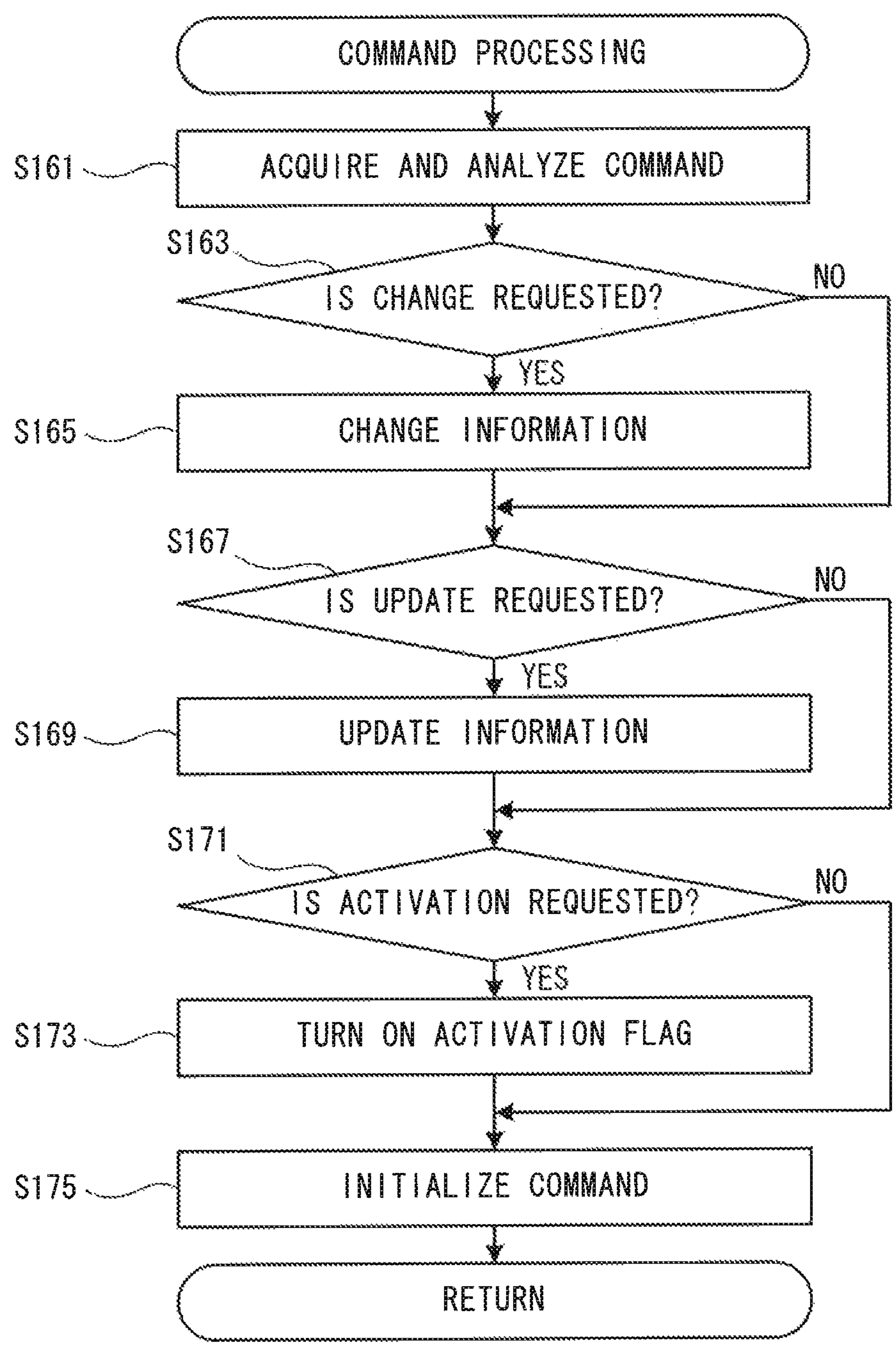
FIG. 12 is a flowchart showing command processing.

The command processing will be explained with reference to FIG. 12. The information stored in the command area 439 by the communication terminal 10 is acquired, and the content of the request from the communication terminal 10 is analyzed (step S161). When the wireless LAN configuration information is stored in the change request area 440 (yes at step S163), it means that the communication terminal 10 has notified the printer 13 of the wireless LAN configuration information. The wireless LAN configuration information is read out from the change request area 440. The wireless LAN configuration information stored in the EEPROM 44 (refer to FIG. 5) is changed to the read out wireless LAN configuration information (step S165). Thus, the wireless LAN control program 66 (refer to FIG. 6) becomes able to operate based on the changed wireless LAN configuration information. The changed wireless LAN configuration information is the same as the wireless LAN configuration information set for the communication terminal 10, or is the wireless LAN configuration information that has been changed to the extent that communication by wireless LAN is not impaired. Therefore, by using the notified wireless LAN configuration information, the printer 13 becomes able to perform communication by wireless LAN with the access point 14. The processing proceeds to step S167. On the other hand, when the information is not stored in the change request area 440 (no at step S163), the processing proceeds to step S167.

When an update request of the configuration information area 433 is stored in the update request area 441 (yes at step S167), the wireless LAN configuration information stored in the EEPROM 44 is read out. The read out wireless LAN configuration information is stored in the second configuration information area 435 of the configuration information area 443 of the flash ROM 43 (step S169). The processing proceeds to step S171. On the other hand, when the information is not stored in the update request area 441 (no at step S167), the processing proceeds to step S171.

When a test printing execution request is stored in the activation request area 442 (yes at step S171), the activation flag stored in the SRAM 42 (refer to FIG. 5) is turned on (step S173). The processing proceeds to step S175. On the other hand, when the information is not stored in the activation request area 442 (no at step S171), the processing proceeds to step S175. At step S175, the command area 439 is cleared and initialized (step S175). The command processing ends and the processing returns to the M class processing (refer to FIG. 11).

Figure 11:
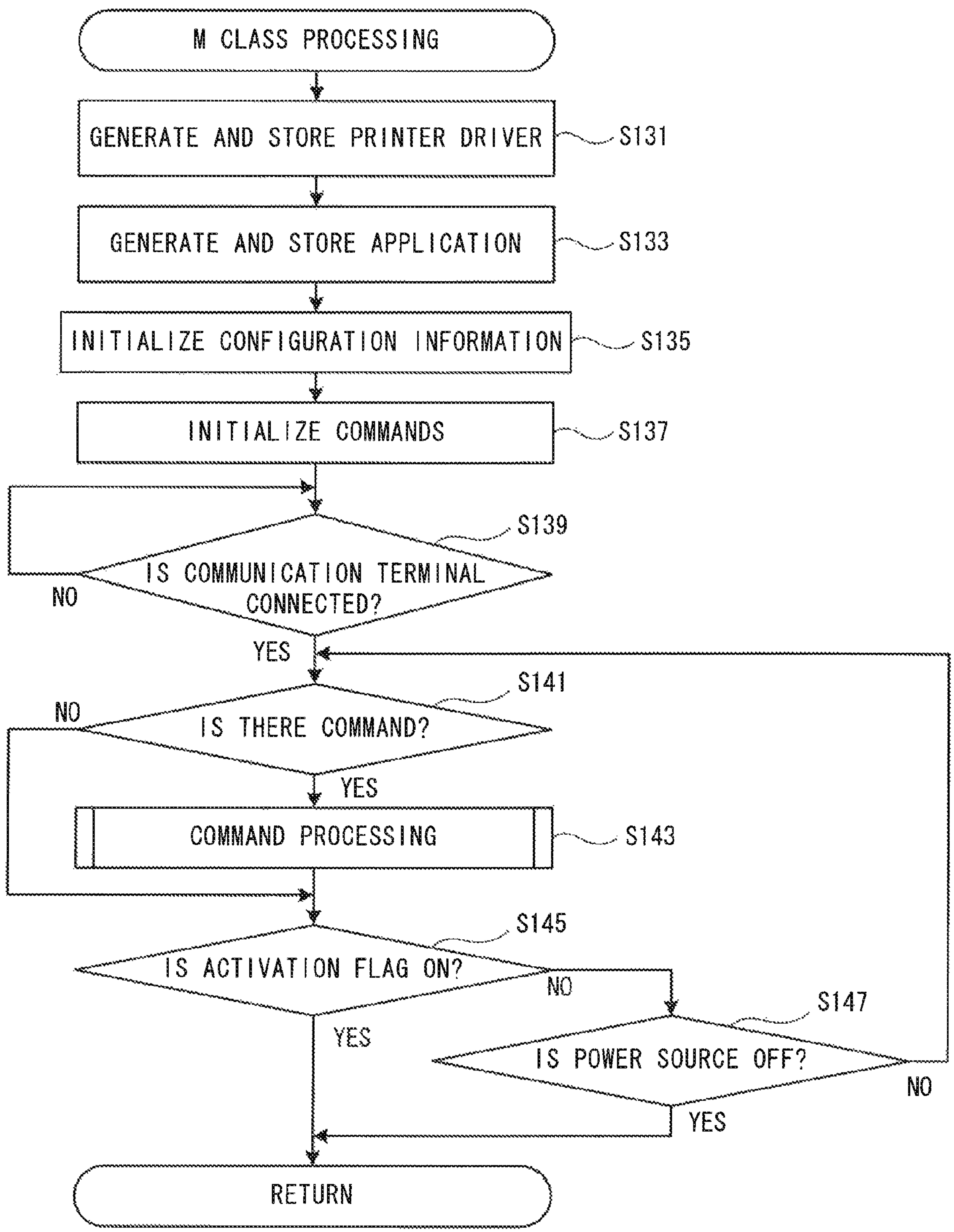
FIG. 11 is a flowchart showing M class processing.

At step S145 in FIG. 11, it is determined whether the activation flag is ON (step S145). When the activation flag is ON (yes at step S145), the execution of test printing is requested (step S173, refer to FIG. 12). Therefore, in order to perform test processing in the P class processing (refer to FIG. 13, to be described later), the command processing ends and the processing returns to the main processing (printer) (refer to FIG. 10).

On the other hand, when the activation flag is OFF (no at step S145), it is determined whether the power source of the printer 13 has been turned off by a power source key of the printer 13 being operated (step S147). When the power source is not OFF (no at step S147), the processing returns to step S141 in order to continuously monitor the storing of information into the command area 439. On the other hand, when the power source is OFF (yes at step S147), the command processing ends and the processing returns to the main processing (printer) (refer to FIG. 10).

As shown in FIG. 10, after the M class processing (step S121) ends, it is determined whether the activation flag is ON (step S123). When the activation flag is not ON (no at step S123), the main processing (printer) ends. On the other hand, when the activation flag is ON (yes at step S123), it means that the execution of test printing has been requested by the communication terminal 10. The P class processing (refer to FIG. 13) is performed in order to perform test printing in response to the request from the communication terminal 10 (step S127). After the P class processing ends, the main processing (printer) ends.

Figure 13:
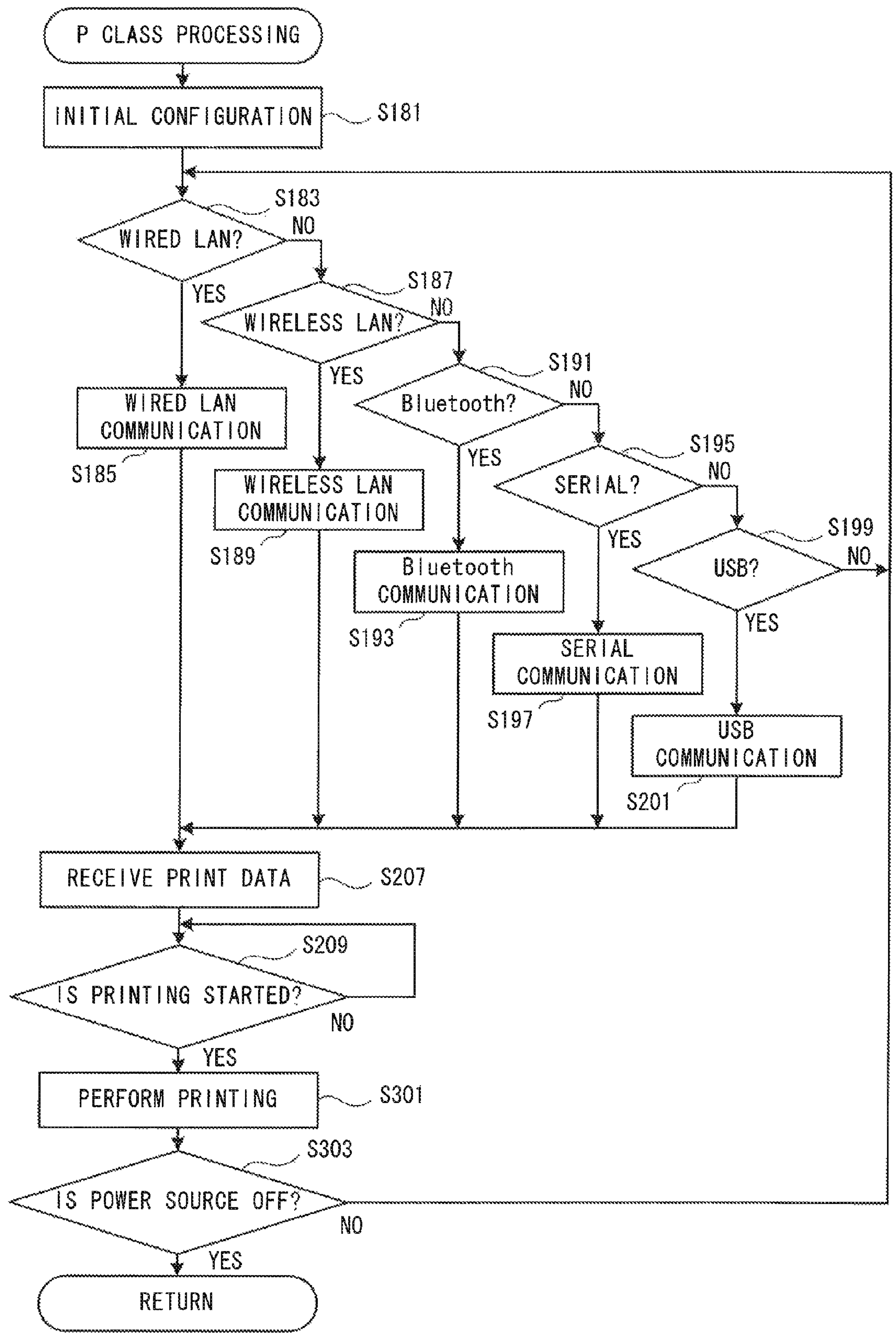
FIG. 13 is a flowchart showing P class processing.

The P class processing will be explained with reference to FIG. 13. Initial configuration is performed (step S181). In the initial configuration, the configuration information stored in the EEPROM 44 is read out. The wired LAN control program 65 is set to operate based on the read wired LAN configuration information. The wireless LAN control program 66 is set to operate based on the read wireless LAN configuration information. The Bluetooth control program 67 is set to operate based on the read Bluetooth configuration information. The serial control program 68 is set to operate based on the read serial configuration information. Note that, as the USB control program 62, one of the M class 63 (step S119, refer to FIG. 10) and the P class 64 (step S125, refer to FIG. 10) is enabled.

It is determined whether communication by wired LAN has been started (step S183). When communication by wired LAN has been started (yes at step S183), the wired LAN control program 65 (refer to FIG. 6) is used to perform communication (step S185), and the print data for test printing is received (step S207). The processing proceeds to step S209.

When communication by wired LAN has not been started (no at step S183), it is determined whether communication by wireless LAN has been started (step S187). When communication by wireless LAN has been started (yes at step S187), the wireless LAN control program 66 (refer to FIG. 6) is used to perform communication (step S189), and the print data for test printing is received (step S207). The print data is received via the access point 14. The processing proceeds to step S209.

When communication by wireless LAN has not been started (no at step S187), it is determined whether communication by Bluetooth has been started (step S191). When communication by Bluetooth has been started (yes at step S191), the Bluetooth control program 67 (refer to FIG. 6) is used to perform communication (step S193), and the print data for test printing is received (step S207). The processing proceeds to step S209.

When communication by Bluetooth has not been started (no at step S191), it is determined whether serial communication has been started (step S195). When serial communication has been started (yes at step S195), the serial control program 68 (refer to FIG. 6) is used to perform communication (step S197), and the print data for test printing is received (step S207). The processing proceeds to step S209.

When serial communication has not been started (no at step S195), it is determined whether communication by USB has been started (step S199). When communication by USB has been started (yes at step S199), the USB control program 62 is used to perform communication (step S201), and the print data for test printing is received (step S207). The processing proceeds to step S209. When communication by USB has not been started (no at step S199), the processing returns to step S183.

It is determined whether an operation to instruct the start of printing has been performed by the user via the operation portion 46 (step S209). When the operation to instruct the start of printing has not been performed (no at step S209), the processing returns to step S209. When the operation to start printing has been performed (yes at step S209), test printing is performed on a print medium based on the print data for test printing received at step S207 (step S301). Thus, when the print data has been received by communication by wireless LAN, the user can confirm that the communication by wireless LAN has been performed properly and can confirm whether the printing processing has been performed properly.

It is determined whether the power source of the printer 13 has been turned off by the power source of the printer 13 being operated (step S303). When the power source has not been turned off (no at step S303), the processing returns to step S183. On the other hand, when the power source has been turned off (yes at step S303), the P class processing ends and the processing returns to the main processing (printer) (refer to FIG. 10). As shown in FIG. 10, in the main processing (printer), after the P class processing (step S127) ends, the main processing (printer) ends.

Main processing (communication terminal) that is performed by the CPU 21 (refer to FIG. 4) of the communication terminal 10 will be explained with reference to FIG. 14 to FIG. 16. The main processing (communication terminal) is activated and performed by the CPU 21 when the power source of the communication terminal 10 is turned ON.

Figure 14:
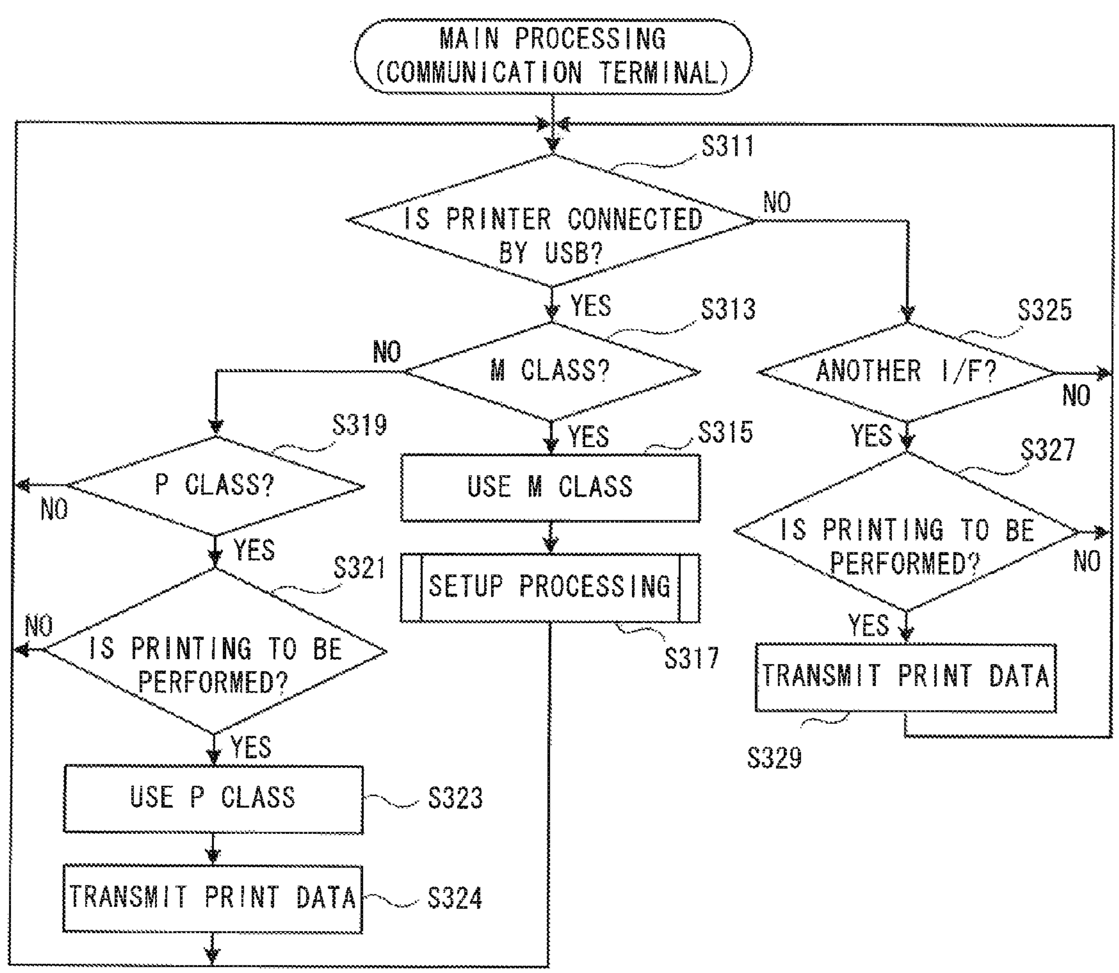
FIG. 14 is a flowchart showing main processing (communication terminal)

As shown in FIG. 14, when the power source of the communication terminal 10 is turned on and the main processing (communication terminal) is activated, it is determined whether the printer 13 is connected via the USB cable 15 (step S311). When the printer 13 is connected via the USB cable 15 (yes at step S311), the USB control program 62 (refer to FIG. 6) that is used in the printer 13 is determined. When, in the printer 13, the M class 63 (refer to FIG. 6) is used as the USB control program 62 (yes at step S313), the M class 73 (refer to FIG. 6) is used as the USB control program 72 (refer to FIG. 6) (step S315). Thus, the printer 13 connected via the USB cable 15 is recognized as a mass storage device. Processing (setup processing, refer to FIG. 15) that performs various types of setup processing for the printer 13 is performed (step S317).

The setup processing will be explained with reference to FIG. 15. Since the printer 13 is recognized as a mass storage device, it is possible to refer to the flash ROM 43 (refer to FIG. 9) of the printer 13. The UI application area 432 is referred to. The UI application 80 (refer to FIG. 6) stored in the UI application area 432 is read out and acquired (step S331). The user performs an operation to activate the UI application 80. The acquired UI application 80 is activated (step S333). Processing (acquisition processing, refer to FIG. 16) to acquire the latest wireless LAN configuration information set in the printer 13 is performed (step S335).

The acquisition processing will be explained with reference to FIG. 16. A request to update the wireless LAN configuration information is stored in the update request area 441 of the command area 439 in the flash ROM 43 of the printer 13 (step S361). After the update request is stored, it is determined whether the wireless LAN configuration information stored in the second configuration information area 435 of the configuration information area 433 of the flash ROM 43 has been updated (step S363). When the wireless LAN configuration information stored in the second configuration information area 435 has not been updated (no at step S363), the processing returns to step S363.

In the printer 13, when the request to update the wireless LAN configuration information is stored in the update request area 441, the wireless LAN configuration information stored in the EEPROM 44 is read out. The read out wireless LAN configuration information is stored in the second configuration information area 435 (step S169, refer to FIG. 12). Since the content of the second configuration information area 435 has been updated (yes at step S363), the wireless LAN configuration information stored in the second configuration information area 435 is read out and acquired (step S365). The acquisition processing ends and the processing returns to the setup processing (refer to FIG. 15).

Figure 15:
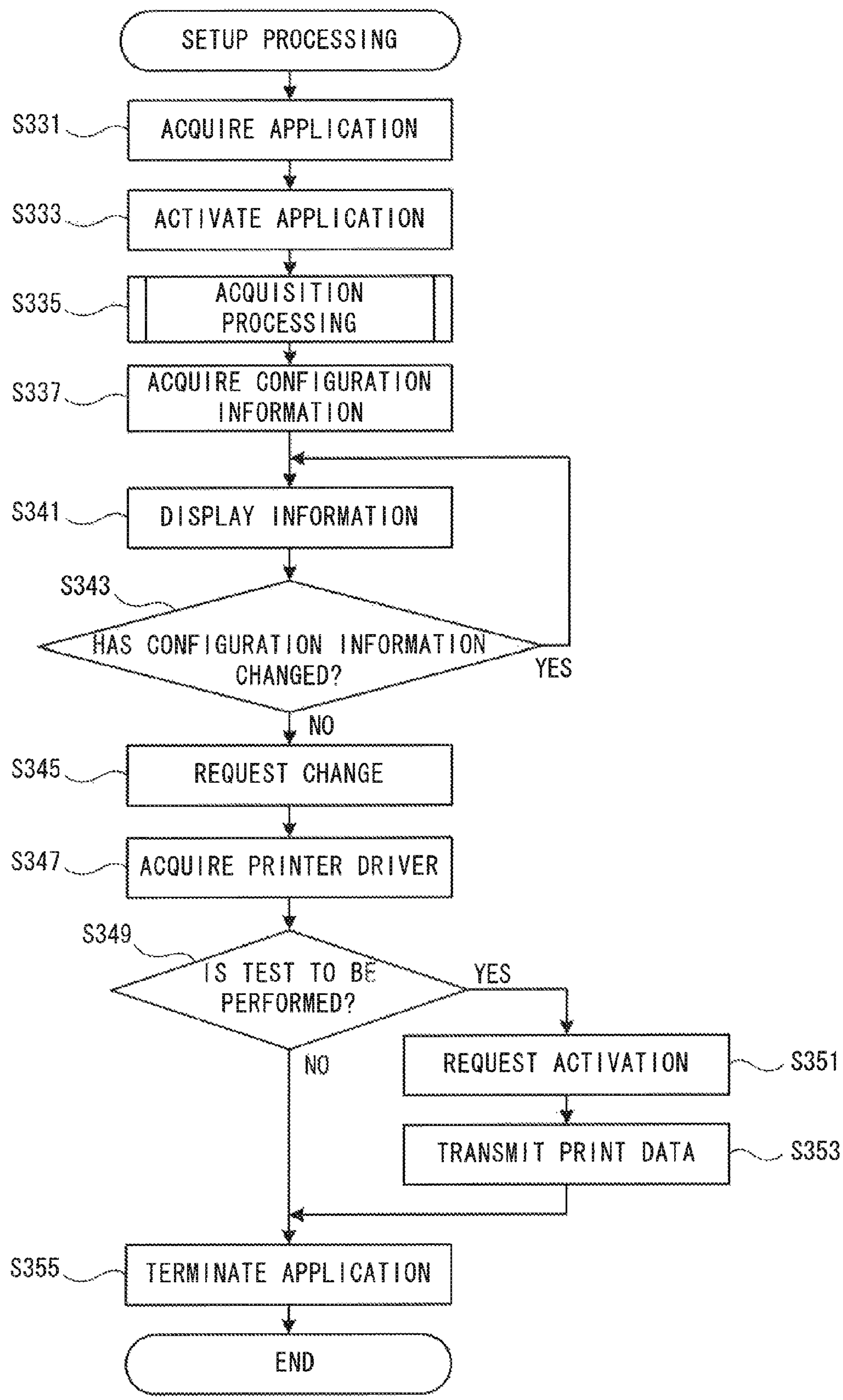
FIG. 15 is a flowchart showing setup processing.
Figure 16:
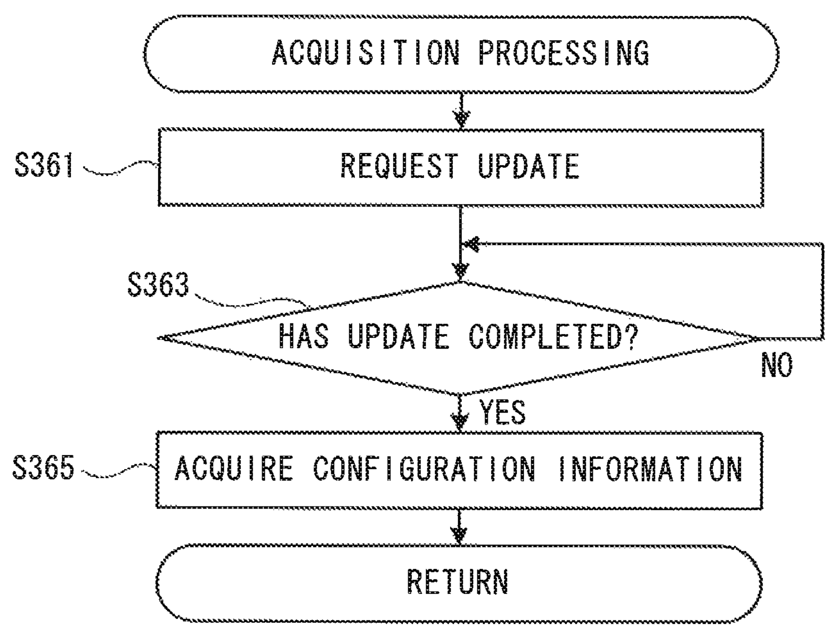
FIG. 16 is a flowchart showing acquisition processing.

As shown in FIG. 15, after the acquisition processing (step S335) ends, the wireless LAN configuration information stored in the HDD 24 is read out and acquired (step S337). The wireless LAN configuration information of the printer 13 acquired at step S335 and the wireless LAN configuration information of the communication terminal 10 acquired at step SS37 are displayed on the display 25 by the UI application 80 activated at step S333 (step S341). For example, the screen 91 shown in FIG. 8 is displayed on the display 25.

On the screen displayed at step S341, it is possible to change the wireless LAN configuration information read out from the HDD 24. The wireless LAN configuration information is changed by the user to the extent that communication by wireless LAN with the access point 14 is not impaired (yes at step S343). The changed wireless LAN configuration information is displayed on the display 25 (step S341).

It is assumed that the user performs an operation to confirm the wireless LAN configuration information to be notified to the printer 13 (no at step S343). For example, it is assumed that the user selects the enter button 94 on the screen 91 shown in FIG. 8 in order to confirm the wireless LAN configuration information displayed as the configuration values 92. The confirmed wireless LAN configuration information is stored in the change request area 440 of the command area 439 in the flash ROM 43 of the printer 13. Thus, the printer 13 is requested to change the wireless LAN configuration information (step S345). In the printer 13, the wireless LAN configuration information stored in the change request area 440 is read out and stored in the EEPROM 44 (step S165, refer to FIG. 12). As a result of this, the wireless LAN configuration information notified from the communication terminal 10 is set for the printer 13.

The printer driver area 431 of the flash ROM 43 of the printer 13 is referred to. The printer driver 79 (refer to FIG. 6) stored in the printer driver area 431 is read out and acquired (step S347). The communication terminal 10 becomes able to issue a printing instruction to the printer 13 by using the acquired printer driver 79.

It is determined whether the user has performed an operation to request the execution of test printing (step S349). When the operation to request the execution of test printing has not been performed (no at step S349), the UI application 80 activated at step S333 is terminated (step S355). The setup processing ends and the processing returns to the main processing (communication terminal) (refer to FIG. 14).

When the operation to request the execution of test printing has been performed by the user (yes at step S349), the test printing is performed by the printer 13 by performing one of communication by wired LAN, communication by wireless LAN, communication by Bluetooth, communication by USB and serial communication. A test printing execution request is stored in the activation request area 442 (step S351). The communication that is selected by the user from among communication by wired LAN, communication by wireless LAN, communication by Bluetooth, communication by USB and serial communication is performed, and the print data for test printing is transmitted to the printer 13 (step S353). The printer driver 79 acquired at step S347 is used when the print data is transmitted. Note that, when communication by wireless LAN is performed, the print data is transmitted to the printer 13 via the access point 14. When the execution request is stored in the activation request area 442 (step S171, refer to FIG. 12), test printing is performed by the printer 13 based on the received print data (step S207, step S301, refer to FIG. 13). The UI application 80 activated at step S333 is terminated (step S355). The setup processing ends and the processing returns to the main processing (communication terminal) (refer to FIG. 14).

On the other hand, at step S313 in FIG. 14, when the M class 63 (refer to FIG. 6) is not used as the USB control program 62 in the printer 13 (no at step S313), it is determined whether the P class 64 (refer to FIG. 6) is used as the USB control program 62 (step S319). When both the M class 63 and the P class 64 are not used in the printer 13 (no at step S319), the processing returns to step S311.

When the P class 64 is used in the printer 13 (yes at step S319), it is determined whether to transmit data to the printer 13 connected via the USB cable 15 and to cause the printer 13 to perform printing (step S321). When the printer 13 is not caused to perform printing (no at step S321), the processing returns to step S311. On the other hand, when data is transmitted to the printer 13 and causes the printer 13 to perform printing (yes at step S321), the P class 74 (refer to FIG. 6) is used as the USB control program 72 (step S323). By doing this, the printer 13 connected via the USB cable 15 is recognized as a printer device. The print data for test printing is transmitted to the printer 13 via the USB cable 15 (step S324). The processing returns to step S311. The printer 13 receives the print data via the USB cable 15 (step S201, step S207, refer to FIG. 13), and the printing processing is performed (step S301, refer to FIG. 13).

On the other hand, when it is determined at step S311 that the printer 13 is not connected (no at step S311), it is determined whether communication by wired LAN, communication by wireless LAN, communication by Bluetooth, or serial communication has been started (step S325). For example, when the communication terminal 10 and the printer 13 are connected by a LAN cable, communication by wired LAN is started. When the communication terminal 10 and the printer 13 are able to perform communication via the access point 14, communication by wireless LAN is started. When the communication terminal 10 and the printer 13 are paired by Bluetooth, communication by Bluetooth is started. When the communication terminal 10 and the printer 13 are connected by a serial communication cable, serial communication is started. When any type of communication has not been started (no at step S325), the processing returns to step S311.

When one of communication by wired LAN, communication by wireless LAN, communication by Bluetooth and serial communication has been started (yes at step S325), it is determined whether to cause the printer 13 to perform printing by transmitting print data to the printer 13 (step S327). When the printer 13 is not caused to perform printing (no at step S327), the processing returns to step S311. On the other hand, when the printer 13 is caused to perform printing by transmitting print data to the printer 13 (yes at step S321), the control program that performs overall control of the started communication is selected from among the wired LAN control program 75, the wireless LAN control program 76, the Bluetooth control program 77 and the serial control program 78. Configuration information corresponding to the selected control program is read out from the HDD 24. The selected control program is set to operate based on the read out configuration information. The print data for test printing is transmitted to the printer 13 (step S329). The processing returns to step S311. The printer 13 receives the print data using one of communication by wired LAN, communication by wireless LAN, communication by Bluetooth and serial communication (step S185, step S189, step S193, step S197, step S207, refer to FIG. 13), and the printing processing is performed (step S301, refer to FIG. 13).

As explained above, the printer 13 can acquire the wireless LAN configuration information, which is necessary to perform communication by wireless LAN, from the communication terminal 10 via the USB cable 15. The printer 13 can perform communication by wireless LAN with the communication terminal 10 via the access point 14, by using the acquired wireless LAN configuration information. It is not necessary for the user to set the wireless LAN configuration information for the printer 13. Therefore, the user can easily start communication by wireless LAN between the printer 13 and the communication terminal 10. Further, the printer 13 can acquire the wireless LAN configuration information via the USB cable 15. The printer 13 can acquire the wireless LAN configuration information by communication with high security.

The communication terminal 10 can easily acquire the printer driver 79 and the UI application 80 by connecting to the printer 13 via the USB cable 15. The communication terminal 10 can easily cause a printing instruction to be executed by acquiring the printer driver 79. Further, the user of the communication terminal 10 can easily change the wireless LAN configuration information to be transmitted to the printer 13, and can set the changed wireless LAN configuration information for the printer 13. Further, the user of the communication terminal 10 need not perform an operation to manually install the printer driver 79 and the UI application 80 in the communication terminal 10.

The communication terminal 10 can recognize the printer 13 as a mass storage device. The communication terminal 10 can notify the printer 13 of the wireless LAN configuration information, by directly accessing the flash ROM 43 of the printer 13. Therefore, the communication terminal 10 can directly and easily notify the printer 13 of the wireless LAN configuration information. Further, it is possible to reliably inhibit the wireless LAN configuration information from leaking to a third party.

By using the M class 63, the printer 13 is recognized as a mass storage device by the communication terminal 10. The M class 73 is normally pre-installed in the OS of the communication terminal 10. Therefore, the printer 13 can easily acquire the wireless LAN configuration information from the communication terminal 10, without the user performing preparation (setting of the M class 73, for example) for the communication terminal 10 to notify the printer 13 of the wireless LAN configuration information.

Note that the present disclosure is not limited to the above-described embodiment and various modifications are possible. In the above-described embodiment, the communication terminal 10 notifies the printer 13 of the wireless LAN configuration information. The printer 13 becomes able to perform communication by wireless LAN with the access point 14, by using the notified wireless LAN configuration information. The communication terminal 10 may notify the printer 13 of other configuration information. The printer 13 may perform communication with the communication terminal 10 using another communication method, by using the notified other configuration information. Hereinafter, an explanation will be made using specific examples.

Figure 17:
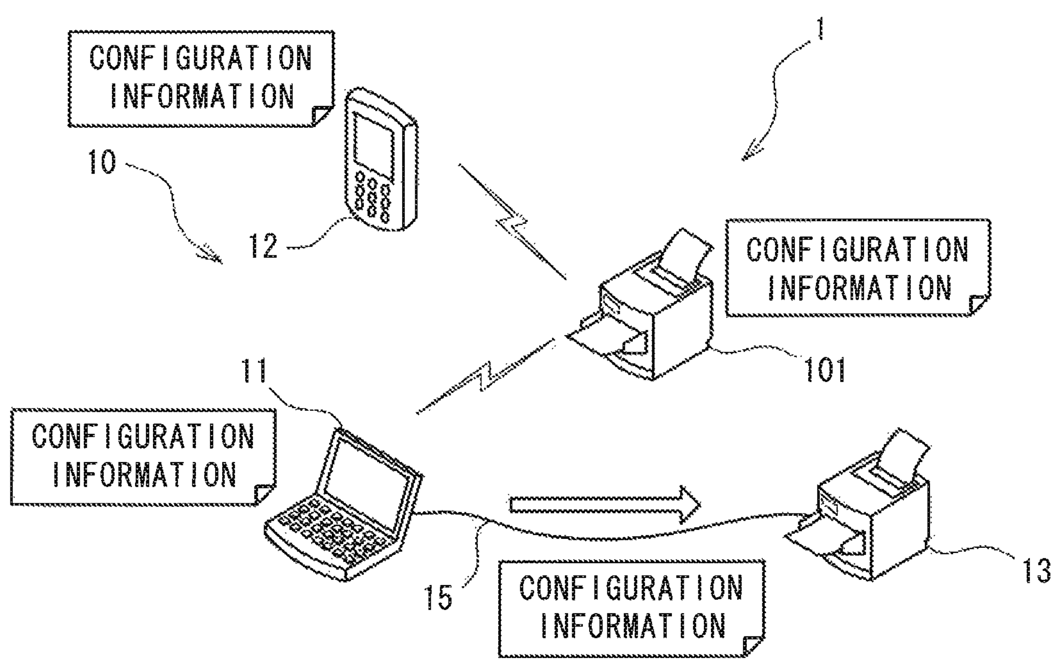
FIG. 17 is a diagram illustrating a method in which the printer 13 acquires the configuration information from the communication terminal 10 in a modified example.

FIG. 17 shows a state in which the Bluetooth configuration information has been set for the communication terminal 10 and a printer 101 and the communication terminal 10 and the printer 101 are able to perform communication by Bluetooth. On the other hand, the Bluetooth configuration information has not been set for the printer 13. Therefore, the printer 13 is not able to perform communication by Bluetooth with the communication terminal 10. As a result, the printer 13 is not able to print data in response to an instruction from the communication terminal 10.

In this type of case, the user connects the communication terminal 11 and the printer 13 via the USB cable 15. The communication terminal 11 recognizes the printer 13 as a mass storage device. The communication terminal 11 stores, in the flash ROM 43 of the printer 13, the Bluetooth configuration information set for the communication terminal 11. The printer 13 reads out and acquires the Bluetooth configuration information stored in the flash ROM 43, and stores the Bluetooth configuration information in the EEPROM 44. The Bluetooth control program 67 of the printer 13 is set to operate based on the Bluetooth configuration information stored in the EEPROM 44. Thus, the printer 13 becomes able to perform communication by Bluetooth with the communication terminal 10. The printer 13 becomes able to print data in response to not only an instruction from the communication terminal 11 but also an instruction from the communication terminal 12. The communication terminal 12 can perform communication with the printer 13 using the same communication system as that of the communication by Bluetooth that is being performed with the printer 101.

Further, in FIG. 17, it is assumed that the wireless LAN configuration information has been set for the communication terminal 10 and the printer 101. It is assumed that the communication terminal 10 and the printer 101 directly perform communication in an ad hoc mode. On the other hand, it is assumed that the wireless LAN configuration information has not been set for the printer 13. Also in this type of case, the communication terminal 11 and the printer 13 are connected via the USB cable 15. The communication terminal 11 stores, in the flash ROM 43 of the printer 13, the wireless LAN configuration information set for the communication terminal 11. The printer 13 reads out and acquires the wireless LAN configuration information stored in the flash ROM 43, and stores the wireless LAN configuration information in the EEPROM 44. The wireless LAN control program 66 of the printer 13 is set to operate based on the wireless LAN configuration information stored in the EEPROM 44. Thus, the printer 13 becomes able to directly perform communication by wireless LAN with the communication terminal 10.

Figure 18:
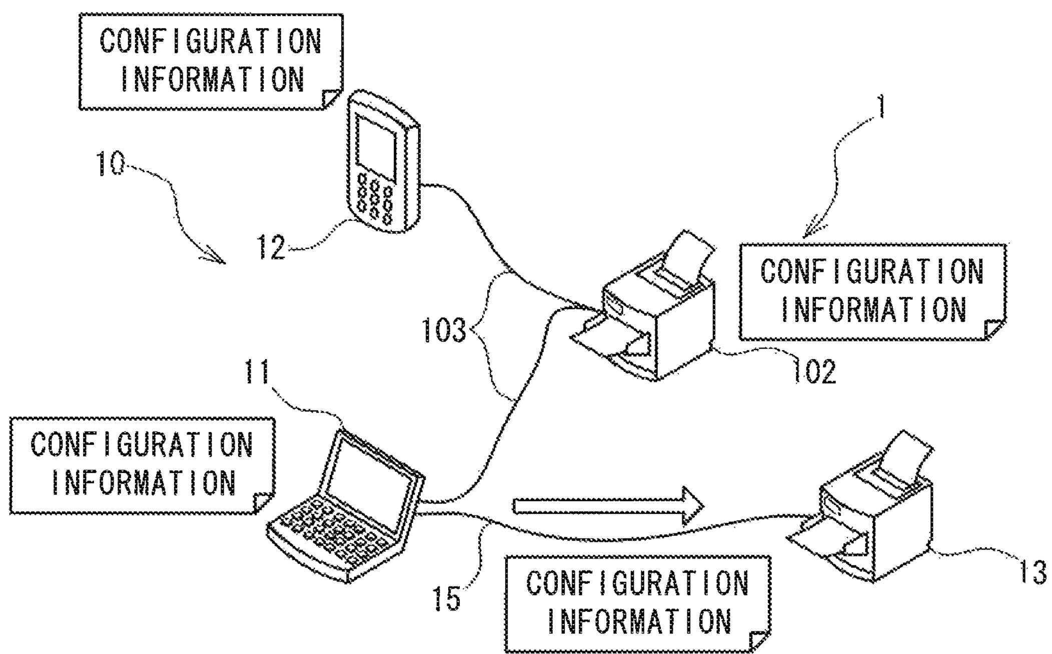
FIG. 18 is a diagram illustrating a method in which the printer 13 acquires the configuration information from the communication terminal 10 in a modified example.

In FIG. 18, each of the communication terminals 10 and a printer 102 are connected by an RS-232C cable 103. The serial configuration information has been set for the communication terminals 10 and the printer 102, and each of the communication terminals 10 and the printer 102 are able to perform serial communication via the RS-232C cable 103. On the other hand, the serial configuration information has not been set for the printer 13. Therefore, the printer 13 cannot perform serial communication with each of the communication terminals 10 via RS-232C.

In this type of case, the user connects the communication terminal 11 and the printer 13 via the USB cable 15. The communication terminal 11 recognizes the printer 13 as a mass storage device. The communication terminal 11 stores, in the flash ROM 43 of the printer 13, the serial configuration information set for the communication terminal 11. The printer 13 reads and acquires the serial configuration information stored in the flash ROM 43, and stores the serial configuration information in the EEPROM 44. The serial control program 68 of the printer 13 is set to operate based on the serial configuration information stored in the EEPROM 44. Thus, the printer 13 becomes able to perform serial communication with the communication terminal 10 via RS-232C. The printer 13 becomes able to print data in response to not only an instruction from the communication terminal 11 but also an instruction from the communication terminal 12. The communication terminal 12 can perform communication with the printer 13 using the same communication system as that of the serial communication that is being performed with the printer 102.

The printer 13 may include a function other than the printing function. For example, the printer 13 may be provided with an image reading function. The communication terminal 10 may instruct the printer 13 to read an image, by performing communication with the printer 13. The communication systems that can be used between the communication terminal 10 and the printer 13 are not limited to those described above. In the above description, the printer 13 is provided with the M class 63 and the P class 64. However, the printer 13 may be provided with the M class 63 only. When the communication between the communication terminal 10 and the printer 13 is performed by wired LAN, wireless LAN or Bluetooth and a printing instruction is issued from the communication terminal 10 to the printer 13, the printing instruction may be issued via a separate printer server. The printer driver 79 and the UI application 80 may be pre-installed in the communication terminal 10.

When the communication terminal 10 and the printer 13 are connected via the USB cable 15, printing conditions may be notified from the communication terminal 10 to the printer 13, together with the configuration information. The printer 13 may acquire the printing conditions from the communication terminal 10 and may store the printing conditions in the EEPROM 44. When the printer 13 performs the printing processing (step S301, refer to FIG. 13), the printer 13 may perform the printing processing based on the printing conditions stored in the EEPROM 44.

When the communication terminal 10 and the printer 13 are connected via the USB cable 15, address information of the printer 13 may be notified from the printer 13 to the communication terminal 10. When communication is performed in order for the communication terminal 10 to instruct the printer 13 to perform printing, the communication terminal 10 may instruct the printer 13 to perform printing by using the notified address information. For example, an IP address corresponds to the address information. The communication terminal 10 may use the notified IP address when the communication terminal 10 performs communication with the printer 13 by wired LAN or wireless LAN.

What is claimed is:

1. A printer comprising:

a connection device that connects via USB to a communication terminal that is able to perform communication based on a specific communication system;

a first storage device that stores a first device driver that causes the communication terminal to recognize the printer as an external storage device;

a second storage device that stores a second device driver that is used by the communication terminal to transmit the instruction to the printer;

a first supply portion that supplies, via USB, the second device driver stored in the second storage device to the communication terminal connected to the connection device, wherein a reception portion receives the instruction transmitted from the communication terminal, by the second device driver supplied by the first supply portion being used by the communication terminal;

an acquisition portion that acquires configuration information, via USB, from the communication terminal connected to the connection device in a state in which the first device driver stored in the first storage device is used and the communication terminal recognizes the printer as the external storage device, the configuration information being information that is necessary for the communication terminal to perform communication based on the specific communication system and being stored in the external storage device by the communication terminal via USB;

the reception portion that receives an instruction transmitted from the communication terminal, by performing communication with the communication terminal based on the specific communication system using the configuration information acquired by the acquisition portion; and a control portion that performs control in accordance with the instruction when the reception portion receives the instruction.

2. The printer according to claim 1, further comprising:

a third storage device that stores an application that receives a change instruction of the configuration information set for the communication terminal; and a second supply portion that supplies, via USB, the application stored in the third storage device to the communication terminal connected to the connection device, wherein when the application supplied by the second supply portion is executed by the communication terminal and the configuration information is changed, the acquisition portion acquires the changed configuration information.

3. The printer according to claim 1, wherein the first device driver is a mass storage class driver.

4. The printer according to claim 1, wherein the communication terminal is able to perform wireless communication with a relay device, the acquisition portion acquires, from the communication terminal via USB, the configuration information necessary for wireless communication that can be performed between the communication terminal and the relay device, and the reception portion receives, via the relay device, the instruction transmitted from the communication terminal, by performing wireless communication with the relay device using the configuration information acquired by the acquisition portion.

5. The printer according to claim 4, wherein the configuration information is at least one of a service set identifier (SSID), an encryption system and an encryption key.

6. The printer according to claim 4, wherein the relay device is able to perform communication with another communication terminal, and the reception portion receives, via the relay device, an instruction transmitted from the other communication terminal, by performing wireless communication with the relay device using the configuration information acquired by the acquisition portion.

7. The printer according to claim 1, wherein the communication terminal is able to perform communication with another printer, the acquisition portion acquires, from the communication terminal via USB, the configuration information necessary for communication that can be performed between the communication terminal and the other printer, and the reception portion receives the instruction transmitted from the communication terminal, by performing communication with the communication terminal using the configuration information acquired by the acquisition portion.

8. The printer according to claim 7, wherein the other printer performs communication with another communication terminal, and the reception portion receives the instruction transmitted from the other communication terminal, by performing communication with the other communication terminal using the configuration information acquired by the acquisition portion.

9. The printer according to claim 1, further comprising:

an update receiving portion that receives an update request of the configuration information from the communication terminal; and a reading portion that, when the update receiving portion receives the update request of the configuration information, reads out the stored configuration information to be acquired by the communication terminal, wherein the reception portion that acquires a changed configuration information stored in the external storage device by the communication terminal via USB when the configuration information read out by the reading portion has been changed by the communication terminal.

10. The printer according to claim 9, further comprising:

a third storage device that stores an application that receives a change instruction of the configuration information set for the communication terminal; and a second supply portion that supplies, via USB, the application stored in the third storage device to the communication terminal connected to the connection device, wherein when the application supplied by the second supply portion is executed by the communication terminal and the configuration information is changed, the acquisition portion acquires the changed configuration information.

* * * * *